United States Patent
Menten et al.

(10) Patent No.: US 11,483,287 B2
(45) Date of Patent: Oct. 25, 2022

(54) RELIABLE FIREWALL

(71) Applicant: Nokia Solutions and Networks Oy, Espoo (FI)

(72) Inventors: Lawrence Menten, Upper Saddle River, NJ (US); Michel Rochon, Kanata (CA); Prashant Shanbhag, North Andover, MA (US)

(73) Assignee: Nokia Solutions and Networks Oy, Espoo (FI)

( * ) Notice: Subject to any disclaimer, the term of this patent is extended or adjusted under 35 U.S.C. 154(b) by 401 days.

(21) Appl. No.: 16/007,759

(22) Filed: Jun. 13, 2018

(65) Prior Publication Data

US 2019/0386959 A1    Dec. 19, 2019

(51) Int. Cl.
*H04L 29/06*    (2006.01)
*H04L 9/40*    (2022.01)

(52) U.S. Cl.
CPC ...... *H04L 63/0254* (2013.01); *H04L 63/0428* (2013.01)

(58) Field of Classification Search
CPC .................................................. H04L 63/0254
USPC ........................................................ 726/11
See application file for complete search history.

(56) References Cited

U.S. PATENT DOCUMENTS

| | | | | |
|---|---|---|---|---|
| 8,316,435 B1* | 11/2012 | Varadhan | ................ | H04L 45/60 726/2 |
| 8,339,959 B1* | 12/2012 | Moisand | ............... | H04L 45/302 370/235 |
| 8,959,612 B2* | 2/2015 | DeBaille | ................. | H04L 63/18 709/224 |
| 10,079,718 B1* | 9/2018 | Matthews | ............... | H04L 63/02 |
| 2003/0141093 A1* | 7/2003 | Tirosh | ..................... | H04L 45/24 174/72 A |
| 2006/0137002 A1* | 6/2006 | Forrester | ................. | H04L 67/14 726/11 |
| 2008/0235755 A1* | 9/2008 | Blaisdell | ............... | H04L 63/102 726/1 |
| 2009/0059937 A1* | 3/2009 | Kanada | ................... | H04L 47/10 370/401 |

(Continued)

OTHER PUBLICATIONS

Kreutz,"Software-Defined Networking: A Comprehensive Survey", Oct. 8, 2014, IEEE, p. 1-61 (Year: 2014).*

*Primary Examiner* — Taghi T Arani
*Assistant Examiner* — Gregory A Lane
(74) *Attorney, Agent, or Firm* — Tong, Rea, Bentley & Kim, LLC

(57) ABSTRACT

Various example embodiments of a reliable firewall are presented herein. Various example embodiments of a reliable firewall may be configured to provide a single, stateful firewall spanning multiple routers. Various example embodiments of a reliable firewall spanning multiple routers may be configured to provide a reliable firewall configured to protect high-availability network services, network services using multipath routing, or the like, as well as various combinations thereof. Various example embodiments of a reliable firewall spanning multiple routers may be configured to provide a reliable firewall by supporting synchronization of firewall synchronization information (e.g., firewall policy information, firewall session state information, or the like, as well as various combinations thereof) across the multiple routers.

19 Claims, 14 Drawing Sheets

(56) References Cited

U.S. PATENT DOCUMENTS

| | | | |
|---|---|---|---|
| 2010/0005263 A1* | 1/2010 | Wu | H04L 69/40 709/227 |
| 2010/0043067 A1* | 2/2010 | Varadhan | H04L 12/18 726/13 |
| 2013/0139247 A1* | 5/2013 | Cianfrocca | H04L 63/02 726/14 |
| 2013/0152187 A1* | 6/2013 | Strebe | H04L 63/101 726/11 |
| 2017/0142068 A1* | 5/2017 | Devarajan | H04L 67/146 |
| 2017/0180316 A1* | 6/2017 | Teng | H04L 63/105 |
| 2017/0279717 A1* | 9/2017 | Bethers | H04L 45/026 |
| 2017/0310641 A1* | 10/2017 | Jiang | H04L 61/103 |
| 2019/0081889 A1* | 3/2019 | Fieau | H04L 65/1069 |
| 2019/0372933 A1* | 12/2019 | Kamisetti | H04L 63/0263 |

* cited by examiner

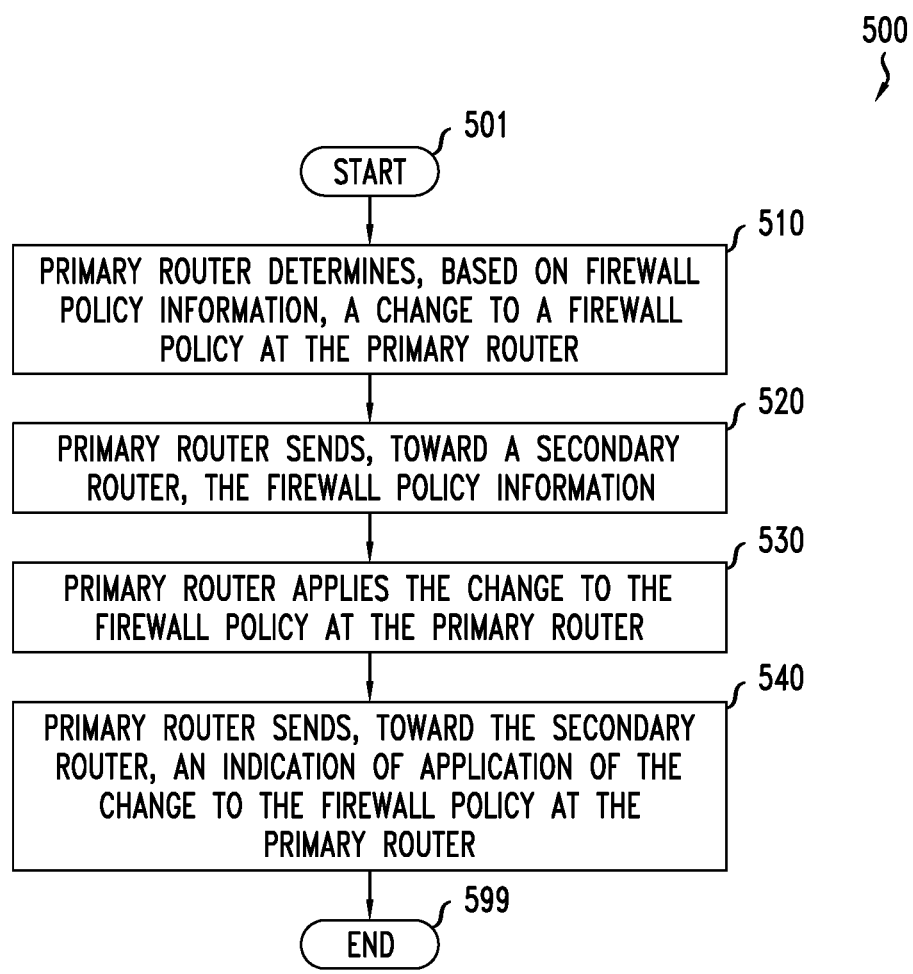

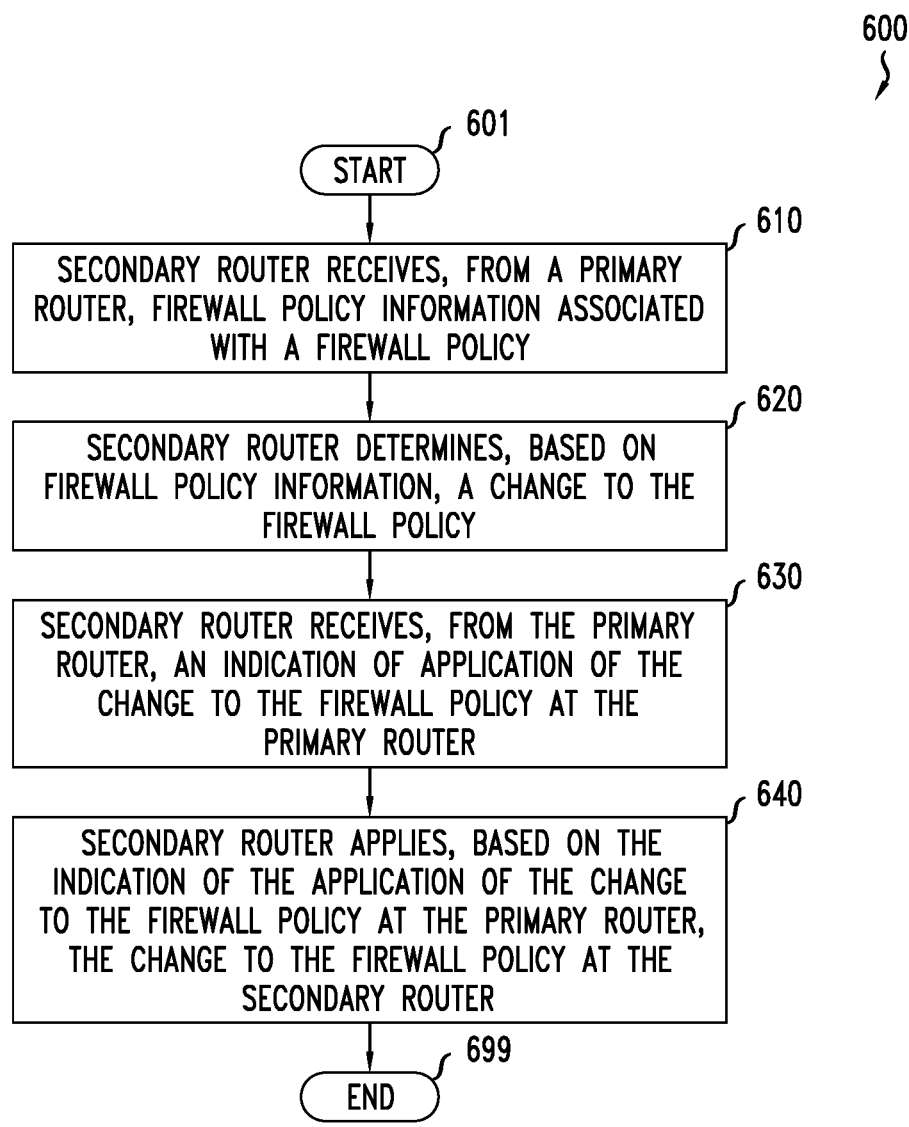

RELIABLE FIREWALL

TECHNICAL FIELD

Various example embodiments relate generally to communication networks and, more particularly but not exclusively, to a reliable firewall for a communication network.

BACKGROUND

Communication networks may be configured to support firewalls which may support various functions for the communication networks.

SUMMARY

In at least some example embodiments, an apparatus is provided. The apparatus includes at least one processor. The apparatus includes at least one memory including computer program code. The at least one memory and the computer program code are configured to, with the at least one processor, cause the apparatus to at least support communication of firewall session state information from a primary router to a secondary router via a datapath secure session between a datapath of the primary router and a datapath of the secondary router. In at least some embodiments, the firewall session state information includes at least one of existing session state information or new session state information. In at least some embodiments, to support communication of the firewall session state information from the primary router to the secondary router via the datapath secure session, the at least one memory and the computer program code are configured to, with the at least one processor, cause the apparatus to at least provide the firewall session state information from a firewall instance of the primary router to the datapath of the primary router via a fast-path firewall link. In at least some embodiments, to support communication of the firewall session state information from the primary router to the secondary router via the datapath secure session, the at least one memory and the computer program code are configured to, with the at least one processor, cause the apparatus to at least receive the firewall session state information at the datapath of the primary router from a firewall instance of the primary router via a fast-path firewall link and send the firewall session state information from the datapath of the primary router toward the datapath of the secondary router via the datapath secure session. In at least some embodiments, to support communication of the firewall session state information from the primary router to the secondary router via the datapath secure session, the at least one memory and the computer program code are configured to, with the at least one processor, cause the apparatus to at least receive the firewall session state information at the datapath of the secondary router from the datapath of the primary router via the datapath secure session and send the firewall session state information from the datapath of the secondary router to a firewall instance of the secondary router via a fast-path firewall link. In at least some embodiments, to support communication of the firewall session state information from the primary router to the secondary router via the datapath secure session, the at least one memory and the computer program code are configured to, with the at least one processor, cause the apparatus to at least receive the firewall session state information at a firewall instance of the secondary router from the datapath of the secondary router via a fast-path firewall link and distribute the firewall session state information from the firewall instance of the secondary router to a set of interface devices of the secondary router. In at least some embodiments, the at least one memory and the computer program code are configured to, with the at least one processor, cause the apparatus to at least support communication of the firewall session state information from the primary router to the secondary router via a control plane secure session between a management instance of the primary router and a management instance of the secondary router. In at least some embodiments, to support communication of the firewall session state information from the primary router to the secondary router via the control plane secure session, the at least one memory and the computer program code are configured to, with the at least one processor, cause the apparatus to at least receive the firewall session state information at the management instance of the primary router from a firewall instance of the primary router and send the firewall session state information from the management instance of the primary router toward the management instance of the secondary router via the control plane secure session. In at least some embodiments, to support communication of the firewall session state information from the primary router to the secondary router via the control plane secure session, the at least one memory and the computer program code are configured to, with the at least one processor, cause the apparatus to at least receive the firewall session state information at the management instance of the secondary router from the management instance of the primary router via the control plane secure session and provide the firewall session state information from the management instance of the secondary router to a firewall instance of the secondary router. In at least some embodiments, to support communication of the firewall session state information from the primary router to the secondary router via the control plane secure session, the at least one memory and the computer program code are configured to, with the at least one processor, cause the apparatus to at least receive the firewall session state information at a firewall instance of the secondary router from the management instance of the secondary router and distribute the firewall session state information from the firewall instance of the secondary router to a set of interface devices of the secondary router. In at least some embodiments, the at least one memory and the computer program code are configured to, with the at least one processor, cause the apparatus to at least receive, at an interface device of the primary router, a packet, determine, by the interface device of the primary router based on the packet, context information associated with the packet, send, by the interface device of the primary router toward a firewall instance of the primary router via a fast-path firewall link, the context information associated with the packet, and receive, by the interface device of the primary router, the firewall session state information. In at least some embodiments, the at least one memory and the computer program code are configured to, with the at least one processor, cause the apparatus to at least receive, at an interface device of the secondary router, a packet, determine, by the interface device of the secondary router based on the packet, context information associated with the packet, send, by the interface device of the secondary router toward the datapath of the secondary router, the context information associated with the packet, and receive, by the interface device of the secondary router, the firewall session state information. In at least some embodiments, the at least one memory and the computer program code are configured to, with the at least one processor, cause the apparatus to at least receive, at the datapath of the secondary router from an interface device of the secondary router, context information associated with a packet received at the interface device of the secondary router and send, by the datapath of the secondary router toward the datapath of the primary router via the datapath secure session, the context information. In at least some embodiments, the at least one memory and the computer program code are configured to, with the at least one processor, cause the apparatus to at least receive, at the datapath of the primary router from the datapath of the secondary router via the datapath secure session, context information associated with a packet received at an interface device of the secondary router and send, by the datapath of the primary router toward a firewall instance of the primary router via a fast-path firewall link, the context information. In at least some embodiments, to support communication of the firewall session state information from the primary router to the secondary router via the datapath secure session, the at least one memory and the computer program code are configured to, with the at least one processor, cause the apparatus to at least receive the firewall session state information at the datapath of the primary router from a firewall instance of the primary router via a fast-path firewall link and broadcast, by the datapath of the primary router, the firewall session state information toward a set of interface devices of the primary router and toward the datapath of the secondary router via the datapath secure session. In at least some embodiments, to support communication of the firewall session state information from the primary router to the secondary router via the datapath secure session, the at least one memory and the computer program code are configured to, with the at least one processor, cause the apparatus to at least receive the firewall session state information at the datapath of the secondary router from the datapath of the primary router via the datapath secure session and broadcast, by the datapath of the secondary router, the firewall session state information toward a set of interface devices of the secondary router.

In at least some example embodiments, a non-transitory computer readable medium is provided. The non-transitory computer-readable medium includes program instructions for causing an apparatus to at least support communication of firewall session state information from a primary router to a secondary router via a datapath secure session between a datapath of the primary router and a datapath of the secondary router. In at least some embodiments, the firewall session state information includes at least one of existing session state information or new session state information. In at least some embodiments, to support communication of the firewall session state information from the primary router to the secondary router via the datapath secure session, the non-transitory computer-readable medium includes program instructions for causing the apparatus to provide the firewall session state information from a firewall instance of the primary router to the datapath of the primary router via a fast-path firewall link. In at least some embodiments, to support communication of the firewall session state information from the primary router to the secondary router via the datapath secure session, the non-transitory computer-readable medium includes program instructions for causing the apparatus to receive the firewall session state information at the datapath of the primary router from a firewall instance of the primary router via a fast-path firewall link and send the firewall session state information from the datapath of the primary router toward the datapath of the secondary router via the datapath secure session. In at least some embodiments, to support communication of the firewall session state information from the primary router to the secondary router via the datapath secure session, the non-transitory computer-readable medium includes program instructions for causing the apparatus to receive the firewall session state information at the datapath of the secondary router from the datapath of the primary router via the datapath secure session and send the firewall session state information from the datapath of the secondary router to a firewall instance of the secondary router via a fast-path firewall link. In at least some embodiments, to support communication of the firewall session state information from the primary router to the secondary router via the datapath secure session, the non-transitory computer-readable medium includes program instructions for causing the apparatus to receive the firewall session state information at a firewall instance of the secondary router from the datapath of the secondary router via a fast-path firewall link and distribute the firewall session state information from the firewall instance of the secondary router to a set of interface devices of the secondary router. In at least some embodiments, the non-transitory computer-readable medium includes program instructions for causing the apparatus to support communication of the firewall session state information from the primary router to the secondary router via a control plane secure session between a management instance of the primary router and a management instance of the secondary router. In at least some embodiments, to support communication of the firewall session state information from the primary router to the secondary router via the control plane secure session, the non-transitory computer-readable medium includes program instructions for causing the apparatus to receive the firewall session state information at the management instance of the primary router from a firewall instance of the primary router and send the firewall session state information from the management instance of the primary router toward the management instance of the secondary router via the control plane secure session. In at least some embodiments, to support communication of the firewall session state information from the primary router to the secondary router via the control plane secure session, the non-transitory computer-readable medium includes program instructions for causing the apparatus to receive the firewall session state information at the management instance of the secondary router from the management instance of the primary router via the control plane secure session and provide the firewall session state information from the management instance of the secondary router to a firewall instance of the secondary router. In at least some embodiments, to support communication of the firewall session state information from the primary router to the secondary router via the control plane secure session, the non-transitory computer-readable medium includes program instructions for causing the apparatus to receive the firewall session state information at a firewall instance of the secondary router from the management instance of the secondary router and distribute the firewall session state information from the firewall instance of the secondary router to a set of interface devices of the secondary router. In at least some embodiments, the non-transitory computer-readable medium includes program instructions for causing the apparatus to receive, at an interface device of the primary router, a packet, determine, by the interface device of the primary router based on the packet, context information associated with the packet, send, by the interface device of the primary router toward a firewall instance of the primary router via a fast-path firewall link, the context information associated with the packet, and receive, by the interface device of the primary router, the firewall session state information. In at least some embodiments, the non-transitory computer-readable medium includes program instructions for causing the apparatus to receive, at an interface device of the secondary router, a packet, determine, by the interface device of the secondary router based on the packet, context information associated with the packet, send, by the interface device of the secondary router toward the datapath of the secondary router, the context information associated with the packet, and receive, by the interface device of the secondary router, the firewall session state information. In at least some embodiments, the non-transitory computer-readable medium includes program instructions for causing the apparatus to receive, at the datapath of the secondary router from an interface device of the secondary router, context information associated with a packet received at the interface device of the secondary router and send, by the datapath of the secondary router toward the datapath of the primary router via the datapath secure session, the context information. In at least some embodiments, the non-transitory computer-readable medium includes program instructions for causing the apparatus to receive, at the datapath of the primary router from the datapath of the secondary router via the datapath secure session, context information associated with a packet received at an interface device of the secondary router and send, by the datapath of the primary router toward a firewall instance of the primary router via a fast-path firewall link, the context information. In at least some embodiments, to support communication of the firewall session state information from the primary router to the secondary router via the datapath secure session, the non-transitory computer-readable medium includes program instructions for causing the apparatus to receive the firewall session state information at the datapath of the primary router from a firewall instance of the primary router via a fast-path firewall link and broadcast, by the datapath of the primary router, the firewall session state information toward a set of interface devices of the primary router and toward the datapath of the secondary router via the datapath secure session. In at least some embodiments, to support communication of the firewall session state information from the primary router to the secondary router via the datapath secure session, the non-transitory computer-readable medium includes program instructions for causing the apparatus to receive the firewall session state information at the datapath of the secondary router from the datapath of the primary router via the datapath secure session and broadcast, by the datapath of the secondary router, the firewall session state information toward a set of interface devices of the secondary router.

In at least some example embodiments, a method is provided. The method includes supporting communication of firewall session state information from a primary router to a secondary router via a datapath secure session between a datapath of the primary router and a datapath of the secondary router. In at least some embodiments, the firewall session state information includes at least one of existing session state information or new session state information. In at least some embodiments, supporting communication of the firewall session state information from the primary router to the secondary router via the datapath secure session includes providing the firewall session state information from a firewall instance of the primary router to the datapath of the primary router via a fast-path firewall link. In at least some embodiments, supporting communication of the firewall session state information from the primary router to the secondary router via the datapath secure session includes receiving the firewall session state information at the datapath of the primary router from a firewall instance of the primary router via a fast-path firewall link and sending the firewall session state information from the datapath of the primary router toward the datapath of the secondary router via the datapath secure session. In at least some embodiments, supporting communication of the firewall session state information from the primary router to the secondary router via the datapath secure session includes receiving the firewall session state information at the datapath of the secondary router from the datapath of the primary router via the datapath secure session and sending the firewall session state information from the datapath of the secondary router to a firewall instance of the secondary router via a fast-path firewall link. In at least some embodiments, supporting communication of the firewall session state information from the primary router to the secondary router via the datapath secure session includes receiving the firewall session state information at a firewall instance of the secondary router from the datapath of the secondary router via a fast-path firewall link and distributing the firewall session state information from the firewall instance of the secondary router to a set of interface devices of the secondary router. In at least some embodiments, the method includes supporting communication of the firewall session state information from the primary router to the secondary router via a control plane secure session between a management instance of the primary router and a management instance of the secondary router. In at least some embodiments, supporting communication of the firewall session state information from the primary router to the secondary router via the control plane secure session includes receiving the firewall session state information at the management instance of the primary router from a firewall instance of the primary router and sending the firewall session state information from the management instance of the primary router toward the management instance of the secondary router via the control plane secure session. In at least some embodiments, supporting communication of the firewall session state information from the primary router to the secondary router via the control plane secure session includes receiving the firewall session state information at the management instance of the secondary router from the management instance of the primary router via the control plane secure session and providing the firewall session state information from the management instance of the secondary router to a firewall instance of the secondary router. In at least some embodiments, supporting communication of the firewall session state information from the primary router to the secondary router via the control plane secure session includes receiving the firewall session state information at a firewall instance of the secondary router from the management instance of the secondary router and distributing the firewall session state information from the firewall instance of the secondary router to a set of interface devices of the secondary router. In at least some embodiments, the method includes receiving, at an interface device of the primary router, a packet, determining, by the interface device of the primary router based on the packet, context information associated with the packet, sending, by the interface device of the primary router toward a firewall instance of the primary router via a fast-path firewall link, the context information associated with the packet, and receiving, by the interface device of the primary router, the firewall session state information. In at least some embodiments, the method includes receiving, at an interface device of the secondary router, a packet, determining, by the interface device of the secondary router based on the packet, context information associated with the packet, sending, by the interface device of the secondary router toward the datapath of the secondary router, the context information associated with the packet, and receiving, by the interface device of the secondary router, the firewall session state information. In at least some embodiments, the method includes receiving, at the datapath of the secondary router from an interface device of the secondary router, context information associated with a packet received at the interface device of the secondary router and sending, by the datapath of the secondary router toward the datapath of the primary router via the datapath secure session, the context information. In at least some embodiments, the method includes receiving, at the datapath of the primary router from the datapath of the secondary router via the datapath secure session, context information associated with a packet received at an interface device of the secondary router and sending, by the datapath of the primary router toward a firewall instance of the primary router via a fast-path firewall link, the context information. In at least some embodiments, supporting communication of the firewall session state information from the primary router to the secondary router via the datapath secure session includes receiving the firewall session state information at the datapath of the primary router from a firewall instance of the primary router via a fast-path firewall link and broadcasting, by the datapath of the primary router, the firewall session state information toward a set of interface devices of the primary router and toward the datapath of the secondary router via the datapath secure session. In at least some embodiments, supporting communication of the firewall session state information from the primary router to the secondary router via the datapath secure session includes receiving the firewall session state information at the datapath of the secondary router from the datapath of the primary router via the datapath secure session and broadcasting, by the datapath of the secondary router, the firewall session state information toward a set of interface devices of the secondary router.

In at least some example embodiments, an apparatus is provided. The apparatus includes means for supporting communication of firewall session state information from a primary router to a secondary router via a datapath secure session between a datapath of the primary router and a datapath of the secondary router. In at least some embodiments, the firewall session state information includes at least one of existing session state information or new session state information. In at least some embodiments, the means for supporting communication of the firewall session state information from the primary router to the secondary router via the datapath secure session includes means for providing the firewall session state information from a firewall instance of the primary router to the datapath of the primary router via a fast-path firewall link. In at least some embodiments, the means for supporting communication of the firewall session state information from the primary router to the secondary router via the datapath secure session includes means for receiving the firewall session state information at the datapath of the primary router from a firewall instance of the primary router via a fast-path firewall link and means for sending the firewall session state information from the datapath of the primary router toward the datapath of the secondary router via the datapath secure session. In at least some embodiments, the means for supporting communication of the firewall session state information from the primary router to the secondary router via the datapath secure session includes means for receiving the firewall session state information at the datapath of the secondary router from the datapath of the primary router via the datapath secure session and means for sending the firewall session state information from the datapath of the secondary router to a firewall instance of the secondary router via a fast-path firewall link. In at least some embodiments, the means for supporting communication of the firewall session state information from the primary router to the secondary router via the datapath secure session includes means for receiving the firewall session state information at a firewall instance of the secondary router from the datapath of the secondary router via a fast-path firewall link and means for distributing the firewall session state information from the firewall instance of the secondary router to a set of interface devices of the secondary router. In at least some embodiments, the apparatus includes means for supporting communication of the firewall session state information from the primary router to the secondary router via a control plane secure session between a management instance of the primary router and a management instance of the secondary router. In at least some embodiments, the means for supporting communication of the firewall session state information from the primary router to the secondary router via the control plane secure session includes means for receiving the firewall session state information at the management instance of the primary router from a firewall instance of the primary router and means for sending the firewall session state information from the management instance of the primary router toward the management instance of the secondary router via the control plane secure session. In at least some embodiments, the means for supporting communication of the firewall session state information from the primary router to the secondary router via the control plane secure session includes means for receiving the firewall session state information at the management instance of the secondary router from the management instance of the primary router via the control plane secure session and means for providing the firewall session state information from the management instance of the secondary router to a firewall instance of the secondary router. In at least some embodiments, the means for supporting communication of the firewall session state information from the primary router to the secondary router via the control plane secure session includes means for receiving the firewall session state information at a firewall instance of the secondary router from the management instance of the secondary router and means for distributing the firewall session state information from the firewall instance of the secondary router to a set of interface devices of the secondary router. In at least some embodiments, the apparatus includes means for receiving, at an interface device of the primary router, a packet, means for determining, by the interface device of the primary router based on the packet, context information associated with the packet, means for sending, by the interface device of the primary router toward a firewall instance of the primary router via a fast-path firewall link, the context information associated with the packet, and means for receiving, by the interface device of the primary router, the firewall session state information. In at least some embodiments, the apparatus includes means for receiving, at an interface device of the secondary router, a packet, means for determining, by the interface device of the secondary router based on the packet, context information associated with the packet, means for sending, by the interface device of the secondary router toward the datapath of the secondary router, the context information associated with the packet, and means for receiving, by the interface device of the secondary router, the firewall session state information. In at least some embodiments, the apparatus includes means for receiving, at the datapath of the secondary router from an interface device of the secondary router, context information associated with a packet received at the interface device of the secondary router and means for sending, by the datapath of the secondary router toward the datapath of the primary router via the datapath secure session, the context information. In at least some embodiments, the apparatus includes means for receiving, at the datapath of the primary router from the datapath of the secondary router via the datapath secure session, context information associated with a packet received at an interface device of the secondary router and means for sending, by the datapath of the primary router toward a firewall instance of the primary router via a fast-path firewall link, the context information. In at least some embodiments, the means for supporting communication of the firewall session state information from the primary router to the secondary router via the datapath secure session includes means for receiving the firewall session state information at the datapath of the primary router from a firewall instance of the primary router via a fast-path firewall link and means for broadcasting, by the datapath of the primary router, the firewall session state information toward a set of interface devices of the primary router and toward the datapath of the secondary router via the datapath secure session. In at least some embodiments, the means for supporting communication of the firewall session state information from the primary router to the secondary router via the datapath secure session includes means for receiving the firewall session state information at the datapath of the secondary router from the datapath of the primary router via the datapath secure session and means for broadcasting, by the datapath of the secondary router, the firewall session state information toward a set of interface devices of the secondary router.

In at least some example embodiments, an apparatus is provided. The apparatus includes at least one processor. The apparatus includes at least one memory including computer program code. The at least one memory and the computer program code are configured to, with the at least one processor, cause the apparatus to at least determine, by a primary router supporting a firewall policy and based on firewall policy information, a change to the firewall policy at the primary router, send, by the primary router toward a secondary router, the firewall policy information, apply, by the primary router, the change to the firewall policy at the primary router, and send, by the primary router toward the secondary router, an indication of application of the change to the firewall policy at the primary router. In at least some embodiments, the firewall policy information is sent from the primary router to the secondary router via a control plane secure session between a management instance of the primary router and a management instance of the secondary router. In at least some embodiments, the control plane secure session is supported by an encrypted link between a datapath of the primary router and a datapath of the secondary router. In at least some embodiments, the firewall policy information is sent from the primary router to the secondary router via a datapath secure session between a datapath of the primary router and a datapath of the secondary router. In at least some embodiments, the datapath secure session is supported by an encrypted link between the datapath of the primary router and the datapath of the secondary router.

In at least some example embodiments, a non-transitory computer readable medium is provided. The non-transitory computer-readable medium includes program instructions for causing an apparatus to at least determine, by a primary router supporting a firewall policy and based on firewall policy information, a change to the firewall policy at the primary router, send, by the primary router toward a secondary router, the firewall policy information, apply, by the primary router, the change to the firewall policy at the primary router, and send, by the primary router toward the secondary router, an indication of application of the change to the firewall policy at the primary router. In at least some embodiments, the firewall policy information is sent from the primary router to the secondary router via a control plane secure session between a management instance of the primary router and a management instance of the secondary router. In at least some embodiments, the control plane secure session is supported by an encrypted link between a datapath of the primary router and a datapath of the secondary router. In at least some embodiments, the firewall policy information is sent from the primary router to the secondary router via a datapath secure session between a datapath of the primary router and a datapath of the secondary router. In at least some embodiments, the datapath secure session is supported by an encrypted link between the datapath of the primary router and the datapath of the secondary router.

In at least some example embodiments, a method is provided. The method includes determining, by a primary router supporting a firewall policy and based on firewall policy information, a change to the firewall policy at the primary router, sending, by the primary router toward a secondary router, the firewall policy information, applying, by the primary router, the change to the firewall policy at the primary router, and sending, by the primary router toward the secondary router, an indication of application of the change to the firewall policy at the primary router. In at least some embodiments, the firewall policy information is sent from the primary router to the secondary router via a control plane secure session between a management instance of the primary router and a management instance of the secondary router. In at least some embodiments, the control plane secure session is supported by an encrypted link between a datapath of the primary router and a datapath of the secondary router. In at least some embodiments, the firewall policy information is sent from the primary router to the secondary router via a datapath secure session between a datapath of the primary router and a datapath of the secondary router. In at least some embodiments, the datapath secure session is supported by an encrypted link between the datapath of the primary router and the datapath of the secondary router.

In at least some example embodiments, an apparatus is provided. The apparatus includes means for determining, by a primary router supporting a firewall policy and based on firewall policy information, a change to the firewall policy at the primary router, means for sending, by the primary router toward a secondary router, the firewall policy information, means for applying, by the primary router, the change to the firewall policy at the primary router, and means for sending, by the primary router toward the secondary router, an indication of application of the change to the firewall policy at the primary router. In at least some embodiments, the firewall policy information is sent from the primary router to the secondary router via a control plane secure session between a management instance of the primary router and a management instance of the secondary router. In at least some embodiments, the control plane secure session is supported by an encrypted link between a datapath of the primary router and a datapath of the secondary router. In at least some embodiments, the firewall policy information is sent from the primary router to the secondary router via a datapath secure session between a datapath of the primary router and a datapath of the secondary router. In at least some embodiments, the datapath secure session is supported by an encrypted link between the datapath of the primary router and the datapath of the secondary router.

In at least some example embodiments, an apparatus is provided. The apparatus includes at least one processor. The apparatus includes at least one memory including computer program code. The at least one memory and the computer program code are configured to, with the at least one processor, cause the apparatus to at least receive, by a secondary router from a primary router, firewall policy information associated with a firewall policy, determine, by the secondary router based on the firewall policy information, a change to the firewall policy, receive, by the secondary router from the primary router, an indication of application of the change to the firewall policy at the primary router, and apply, by the secondary router based on the indication of application of the change to the firewall policy at the primary router, the change to the firewall policy at the secondary router. In at least some embodiments, the firewall policy information is received by the secondary router from the primary router via a control plane secure session between a management instance of the secondary router and a management instance of the primary router. In at least some embodiments, the control plane secure session is supported by an encrypted link between a datapath of the secondary router and a datapath of the primary router. In at least some embodiments, the firewall policy information is received by the secondary router from the primary router via a datapath secure session between a datapath of the secondary router and a datapath of the primary router. In at least some embodiments, the datapath secure session is supported by an encrypted link between the datapath of the secondary router and the datapath of the primary router.

In at least some example embodiments, a non-transitory computer readable medium is provided. The non-transitory computer-readable medium includes program instructions for causing an apparatus to at least receive, by a secondary router from a primary router, firewall policy information associated with a firewall policy, determine, by the secondary router based on the firewall policy information, a change to the firewall policy, receive, by the secondary router from the primary router, an indication of application of the change to the firewall policy at the primary router, and apply, by the secondary router based on the indication of application of the change to the firewall policy at the primary router, the change to the firewall policy at the secondary router. In at least some embodiments, the firewall policy information is received by the secondary router from the primary router via a control plane secure session between a management instance of the secondary router and a management instance of the primary router. In at least some embodiments, the control plane secure session is supported by an encrypted link between a datapath of the secondary router and a datapath of the primary router. In at least some embodiments, the firewall policy information is received by the secondary router from the primary router via a datapath secure session between a datapath of the secondary router and a datapath of the primary router. In at least some embodiments, the datapath secure session is supported by an encrypted link between the datapath of the secondary router and the datapath of the primary router.

In at least some example embodiments, a method is provided. The method includes receiving, by a secondary router from a primary router, firewall policy information associated with a firewall policy, determining, by the secondary router based on the firewall policy information, a change to the firewall policy, receiving, by the secondary router from the primary router, an indication of application of the change to the firewall policy at the primary router, and applying, by the secondary router based on the indication of application of the change to the firewall policy at the primary router, the change to the firewall policy at the secondary router. In at least some embodiments, the firewall policy information is received by the secondary router from the primary router via a control plane secure session between a management instance of the secondary router and a management instance of the primary router. In at least some embodiments, the control plane secure session is supported by an encrypted link between a datapath of the secondary router and a datapath of the primary router. In at least some embodiments, the firewall policy information is received by the secondary router from the primary router via a datapath secure session between a datapath of the secondary router and a datapath of the primary router. In at least some embodiments, the datapath secure session is supported by an encrypted link between the datapath of the secondary router and the datapath of the primary router.

In at least some example embodiments, an apparatus is provided. The apparatus includes means for means for receiving, by a secondary router from a primary router, firewall policy information associated with a firewall policy, means for determining, by the secondary router based on the firewall policy information, a change to the firewall policy, means for receiving, by the secondary router from the primary router, an indication of application of the change to the firewall policy at the primary router, and means for applying, by the secondary router based on the indication of application of the change to the firewall policy at the primary router, the change to the firewall policy at the secondary router. In at least some embodiments, the firewall policy information is received by the secondary router from the primary router via a control plane secure session between a management instance of the secondary router and a management instance of the primary router. In at least some embodiments, the control plane secure session is supported by an encrypted link between a datapath of the secondary router and a datapath of the primary router. In at least some embodiments, the firewall policy information is received by the secondary router from the primary router via a datapath secure session between a datapath of the secondary router and a datapath of the primary router. In at least some embodiments, the datapath secure session is supported by an encrypted link between the datapath of the secondary router and the datapath of the primary router.

In at least some example embodiments, an apparatus is provided. The apparatus includes at least one processor. The apparatus includes at least one memory including computer program code. The at least one memory and the computer program code are configured to, with the at least one processor, cause the apparatus to at least support, by a first router, a first service connection between the first router and a second router for a first service instance and support, by the first router, a second service connection between the first router and a third router for a second service instance. In at least some embodiments, the first router is configured as a primary router for the first service instance and is configured as a secondary router for the second service instance. In at least some embodiments, the second router is configured as a secondary router for the first service instance and the third router is configured as a secondary router for the second service instance. In at least some embodiments, the first router is configured as a primary router for the first service instance and is configured as a primary router for the second service instance. In at least some embodiments, the second router is configured as a secondary router for the first service instance and the third router is configured as a secondary router for the second service instance. In at least some embodiments, the first service instance includes a first virtual service instance and the second service instance includes a second virtual service instance.

In at least some example embodiments, a non-transitory computer readable medium is provided. The non-transitory computer-readable medium includes program instructions for causing an apparatus to at least support, by a first router, a first service connection between the first router and a second router for a first service instance and support, by the first router, a second service connection between the first router and a third router for a second service instance. In at least some embodiments, the first router is configured as a primary router for the first service instance and is configured as a secondary router for the second service instance. In at least some embodiments, the second router is configured as a secondary router for the first service instance and the third router is configured as a secondary router for the second service instance. In at least some embodiments, the first router is configured as a primary router for the first service instance and is configured as a primary router for the second service instance. In at least some embodiments, the second router is configured as a secondary router for the first service instance and the third router is configured as a secondary router for the second service instance. In at least some embodiments, the first service instance includes a first virtual service instance and the second service instance includes a second virtual service instance.

In at least some example embodiments, a method is provided. The method includes supporting, by a first router, a first service connection between the first router and a second router for a first service instance and supporting, by the first router, a second service connection between the first router and a third router for a second service instance. In at least some embodiments, the first router is configured as a primary router for the first service instance and is configured as a secondary router for the second service instance. In at least some embodiments, the second router is configured as a secondary router for the first service instance and the third router is configured as a secondary router for the second service instance. In at least some embodiments, the first router is configured as a primary router for the first service instance and is configured as a primary router for the second service instance. In at least some embodiments, the second router is configured as a secondary router for the first service instance and the third router is configured as a secondary router for the second service instance. In at least some embodiments, the first service instance includes a first virtual service instance and the second service instance includes a second virtual service instance.

In at least some example embodiments, an apparatus is provided. The apparatus includes means for supporting, by a first router, a first service connection between the first router and a second router for a first service instance and means for supporting, by the first router, a second service connection between the first router and a third router for a second service instance. In at least some embodiments, the first router is configured as a primary router for the first service instance and is configured as a secondary router for the second service instance. In at least some embodiments, the second router is configured as a secondary router for the first service instance and the third router is configured as a secondary router for the second service instance. In at least some embodiments, the first router is configured as a primary router for the first service instance and is configured as a primary router for the second service instance. In at least some embodiments, the second router is configured as a secondary router for the first service instance and the third router is configured as a secondary router for the second service instance. In at least some embodiments, the first service instance includes a first virtual service instance and the second service instance includes a second virtual service instance.

BRIEF DESCRIPTION OF THE DRAWINGS

The teachings herein can be readily understood by considering the following detailed description in conjunction with the accompanying drawings, in which:

FIG. 5 depicts an example embodiment of a method for use by a primary router to support synchronization of firewall policy information among multiple routers providing a reliable firewall;

FIG. 6 depicts an example embodiment of a method for use by a primary router to support synchronization of firewall policy information among multiple routers providing a reliable firewall;

To facilitate understanding, identical reference numerals have been used, where possible, to designate identical elements that are common to the figures.

DETAILED DESCRIPTION

Figure 1:
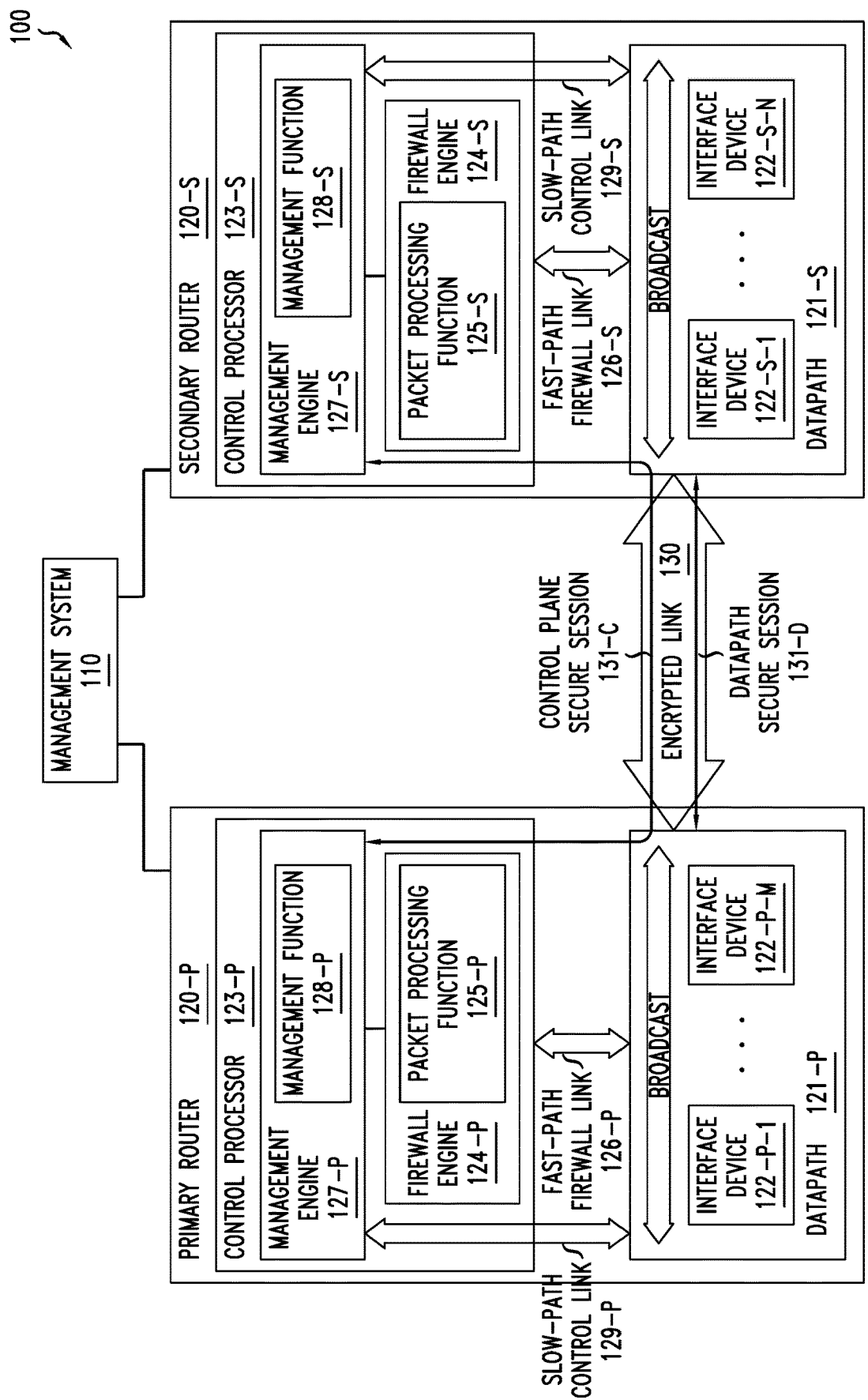
FIG. 1 depicts an example embodiment of a communication system configured to support a reliable firewall spanning multiple routers.

Various example embodiments of a reliable firewall are presented herein. Various example embodiments of a reliable firewall may be configured to provide a single, stateful firewall spanning multiple routers (which also may be referred to herein as a multi-chassis router of multiple peer routers, a router-instance-spanning firewall, or a multiple-router-redundant firewall). Various example embodiments of a reliable firewall spanning multiple routers may be configured to provide a reliable firewall configured to protect high-availability network services, network services using multipath routing, or the like, as well as various combinations thereof. Various example embodiments of a reliable firewall spanning multiple routers may be configured to provide a reliable firewall by supporting synchronization of firewall synchronization information (e.g., firewall policy information, firewall session state information, or the like, as well as various combinations thereof) across the multiple routers. Various example embodiments of a reliable firewall spanning multiple routers may be configured to support synchronization of firewall synchronization information across the multiple routers based on use of an encrypted link between the routers that supports a logically extended datapath across the routers (e.g., the datapaths of the routers appear to be, and operate as, a single datapath for the routers and the reliable firewall provided by the routers such that the datapath of the routers may be said to span the multiple routers and, thus, also may be referred to as a virtual datapath for the reliable firewall). Various example embodiments of a reliable firewall spanning multiple routers may be configured to support synchronization of firewall policy information (e.g., firewall policy configuration information, firewall policy state information, or the like) across the multiple routers using bulk policy synchronization capabilities for existing firewall policy information and incremental policy synchronization capabilities for new firewall policy information. Various example embodiments of a reliable firewall spanning multiple routers may be configured to support synchronization of firewall policy information across the multiple routers in a manner for reducing or minimizing session disruptions from firewall policy configuration actions (e.g., firewall policy changes, failures or failure recovery, or the like) and, thus, supporting high availability and multipath routing for firewall sessions. Various example embodiments of a reliable firewall spanning multiple routers may be configured to support synchronization of firewall session state information across the multiple routers based on connection of the datapaths of the multiple routers to provide a logically extended datapath of the multiple routers. Various example embodiments of a reliable firewall spanning multiple routers may be configured to support synchronization of firewall session state information across the multiple routers, thereby duplicating firewall session state information across the peer routers and, thus, supporting high availability and multipath routing for firewall sessions. Various example embodiments of a reliable firewall spanning multiple routers may be configured to support reliable firewall features for various communication protocols (e.g., Transmission Control Protocol (TCP), User Datagram Protocol (UDP), Internet Control Message Protocol (ICMP), Internet Group Management Protocol (IGMP), Stream Control Transmission Protocol (SCTP), of the like, as well as various combinations thereof) and within various communication contexts (e.g., telecommunications systems, critical infrastructure (e.g., power network infrastructure), or the like). Various example embodiments of a reliable firewall spanning multiple routers may be configured to support a logically extended router datapath that spans the multiple routers and, thus, supports multipath protocols (e.g., Virtual Router Redundancy Protocol (VRRP), Link Aggregation Group (LAG), or the like) with low and deterministic session establishment latency and failure recovery. Various example embodiments of a reliable firewall spanning multiple routers may be configured to support high availability and multipath routing for various types of virtualized services (e.g., VRRP, Virtual Private Routing Services (VPRSs), Virtual Private Local Area Network (LAN) Services (VPLSs), or the like, as well as various combinations thereof. Various example embodiments of a reliable firewall spanning multiple routers may be configured to support application-layer session enablement (e.g., File Transfer Protocol (FTP), Trivial FTP (TFTP), Session Initiation Protocol (SIP), TCP State Enforcement (TCP-SE), or the like) in configurations where the forward and reverse communications paths may differ. Various example embodiments of a reliable firewall spanning multiple routers may be configured to provide such reliable firewall features for heterogeneous routers (e.g., routers which may differ in configuration, capacity, or the like, as well as various combinations thereof). It will be appreciated that these and various other example embodiments for supporting a reliable firewall may be further understood by way of reference to the various figures, which are discussed further below.

FIG. 1 depicts an example embodiment of a communication system configured to support a reliable firewall spanning multiple routers.

The communication system 100 includes a management system (MS) 110 and a set of routers 120 including a primary router (PR) 120-P and a secondary router (SR) 120-S. The routers 120 are configured to support a reliable firewall feature that spans the routers 120. The configurations of the PR 120-P and the SR 120-S are similar; however, as discussed further below, firewall communications are active on the PR 120-P and but may be at least partially limited on the SR 120-S.

The MS 110 is configured to support various management functions for managing the routers 120. The MS 110 may be configured to support management of the routers 120 based on use of various management protocols (e.g., Simple Network Management Protocol, NETCONF Configuration Protocol, or the like), command line interfaces (CLIs), or the like, as well as various combinations thereof. The MS 110 may be configured to support network provisioning functions (e.g., configuration of the routers 120, connectivity between the routers 120, or the like), network and service monitoring and diagnostics functions, or the like, as well as various combinations thereof. The MS 110 may be configured to support definition of firewall policy information and installation of firewall policy information on the routers 120, where such firewall policy information may be configured for use in supporting and controlling firewall session establishment on the routers 120. The MS 110 may be configured to provide various other management functions for the routers 120.

The routers 120 each include a datapath (DP) 121 (illustratively, PR 120-P includes a DP 121-P and SR 120-S includes a DP 121-S) and a control processor (CP) 123 (illustratively, PR 120-P includes a CP 123-P and SR 120-S includes a CP 123-S). The DPs 121 of the routers 120 each include a set of interface devices (IDs) 122 (illustratively, PR 120-P includes a set of IDs 122-P-1-122-P-M and SR 120-S includes a set of IDs 122-S-1-122-S-N, where M and N may or may not be equal). The CPs 123 of the routers 120 each include a firewall engine (FE) 124 (illustratively, PR 120-P includes an FE 124-P and SR 120-S includes a FE 124-S, where the FEs 124 also may be referred to herein as firewall instances with FE 124-P being a primary firewall instance and FE 124-S being a secondary firewall instance) configured to support a packet processing function (PPF) 125 (illustratively, FE 124-P of PR 120-P includes a PPF 125-P and FE 124-S of SR 120-S includes a PPF 125-S) and a management engine (ME) 127 (illustratively, PR 120-P includes an ME 127-P and SR 120-S includes an ME 127-S, where the MEs 127 also may be referred to herein as management instances with ME 127-P being a primary management instance and ME 127-S being a secondary management instance) configured to support a management function (MF) 128 (illustratively, ME 127-P of PR 120-P includes an MF 128-P and ME 127-S of SR 120-S includes an MF 128-S). The routers 120 are configured to support firewall communications between the CPs 123 and the DPs 121 using (1) fast-path firewall links (FPFLs) 126 configured to support control communications between the FEs 124 and the DPs 121 (illustratively, FPFL 126-P between the FE 124-P and the DP 121-P and FPFL 126-S between the FE 124-S and the DP 121-S) and (2) slow-path control links (SPCLs) 129 configured to support control communications between the MEs 127 and the DPs 121 (illustratively, SPCL 129-P between the ME 127-P and the DP 121-P and SPCL 129-S between the ME 127-S and the DP 121-S). It will be appreciated that the routers 120 may be arranged in various other ways, may include various other elements, or the like, as well as various combinations thereof.

The DPs 121 of the routers 120 are configured to support communications of the routers 120. The DPs 121 are configured to support communications of the routers 120 in the fast path. The DPs 121 may be configured to support various types of communications, including session communications (e.g., communications of data sessions of the routers 120, communications of control sessions of the routers 120, or the like, as well as various combinations thereof), synchronization communications for use in synchronizing the routers 120 to provide the reliable firewall (e.g., transport of firewall synchronization information, such as firewall policy information, firewall session state information, or the like), or the like, as well as various combinations thereof. The DPs 121 are configured to support broadcasting of communications in the DPs 121 (e.g., DP 121-P supports broadcasting of communications between the IDs 122-P and DP 121-S supports broadcasting of communications between the IDs 122-S). The DPs 121 may be configured to support various other functions configured to support synchronization of the routers 120 to provide the reliable firewall.

The IDs 122 of the routers 120 are configured to support communications of the routers 120. The IDs 122 are configured to support communications of the routers 120 in the fast path. The IDs 122 may be configured to support various types of communications, including session communications (e.g., communications of data sessions of the routers 120, communications of control sessions of the routers 120, or the like, as well as various combinations thereof), synchronization communications for use in synchronizing the routers 120 to provide the reliable firewall (e.g., transport of firewall synchronization information, such as firewall policy information, firewall session state information, or the like), or the like, as well as various combinations thereof. The IDs 122 each may include network-facing interfaces, local-facing interfaces, or a combination thereof. The IDs 122 are configured to support handling of session communications of the routers 120 based on use of firewall session lookup tables maintained on the IDs 122, respectively, where the firewall session lookup tables may be used to maintain firewall session state information for communication sessions supported by the reliable firewall of the routers 120 and for use in supporting firewall session establishment, handling, and termination functions. The firewall session state information stored in the firewall session lookup tables of the IDs 122 may include, for a given firewall session, firewall session match conditions that may be used to match packets of the firewall session, per-session constraints for the firewall session which may be configured to place constraints on packets of the firewall session, firewall session establishment and termination identification conditions, identification of any firewall policies associated with the firewall session, or the like, as well as various combinations thereof. The firewall session match conditions may include information which may be used to match packets of the firewall session, such as 5-tuples, 6-tuples that include 5-tuples as well as additional information (e.g., one or more service identifiers or other identifiers) that may be used to match packets where virtualization mechanisms (e.g., Layer 2 (L2) virtualization, Layer 3 (L3) virtualization, or the like, as well as various combinations thereof) are used (e.g., virtual routing forwarding (VRF) identifiers, VPLS identifiers or the like), or the like. The per-session constraints for the firewall session may include specifications of IP options permitted for the firewall session, selection of a rate policer to rate-limit the firewall session, an indicator that certain packets (e.g., for certain sessions, such as TCP sessions, UDP sessions, or the like) or all packets (e.g., for certain sessions, such as Strict TCP, FTP pinholing/NAT traversal, or the like) of the firewall session are to be directed to the primary firewall instance (namely, FE 124-P), indications of the number of packets matching the firewall session tuple that are permitted (e.g., the number of ICMP requests/responses), the timeout interval for activity on the firewall session, or the like, as well as various combinations thereof The firewall session establishment and termination identification conditions may be configured for use in determining when the firewall session reaches the established state or the terminated state, may be used to direct packets that would cause a state change (e.g., SYN-ACK, ACK, FIN, RST, or the like for TCP connections) to appropriate modules (e.g., to the primary firewall instance (namely, FE 124-P)) for providing various functions (e.g., monitoring state change, adjusting timeouts, or the like), or the like, as well as various combinations thereof. The firewall session state information stored in the firewall session lookup tables of the IDs 122 may include less or more information, may vary across the various protocols, or the like, as well as various combinations thereof. The IDs 122 are configured to support use of portions of the firewall policy information (e.g., tables which map interfaces to policy zones, firewall policy information stored as part of the session state information in the firewall session lookup tables such that it may be used for handling the sessions, or the like, as well as various combinations thereof) to support policy-based handling of session communications of the routers 120. In at least some embodiments, the IDs 122 may be considered to be line cards of the routers 120. The IDs 122 may be configured to support various other functions configured to support synchronization of the routers 120 to provide the reliable firewall.

The CPs 123 of the routers 120 are configured to support control plane functions for the routers 120, respectively. The control plane functions provided by the CPs 123 may include various functions which may be supported by the PPFs 125 and other functions of the FEs 124, various functions which may be supported by the MFs 128 and other functions of the MEs 127, or the like, as well as various combinations thereof. It is noted that, although operating as a secondary router, the CP 123-S of SR 120-S (including FE 124-S of SR 120-S and ME 127-S of SR 120-S) is active (even though, as discussed further below, the firewall communications of SR 120-S may be at least partially limited).

The FEs 124 of the routers 120 are configured to support establishment of firewall sessions by PPFs 125. The PPFs 125 of the FEs 124 of the routers 120 are configured to support establishment of firewall sessions based on firewall policy information including rules which may specify which types of sessions may be established, the quantity of sessions which may be established between endpoints, restrictions to be enforced upon the behavior of firewall sessions, or the like, as well as various combinations thereof The PPFs 125 of the FEs 124 of the routers 120 may be configured to download firewall session state information into firewall session tables of the DPs 121 of the routers 120, respectively. The FEs 124 and associated PPFs 125 may be configured to support various other functions configured to support synchronization of the routers 120 to provide the reliable firewall.

The MEs 127 of the routers 120 are configured to support management functions provided by MFs 128. The MFs 128 of the MEs 127 of the routers 120 may be configured to support communications between the routers 120 and the MS 110 (e.g., based on SNMP or other management protocols, CLI, or the like, as well as various combinations thereof), managing the election process for determining primary and secondary roles of the routers, providing functions for supporting synchronization of the routers 120 to provide the reliable firewall (e.g., controlling establishment of links and sessions which may be used for supporting synchronization of the routers 120 to provide the reliable firewall (e.g., encrypted links between routers 120, secure sessions between elements of routers, or the like, as well as various combinations thereof), controlling synchronization of firewall policy information and firewall session state information), providing monitoring and troubleshooting functions for the reliable firewall, controlling failover and recovery functions (e.g., managing role transitions when an activity switch between routers 120 occurs, managing recovery from failure, or the like), or the like, as well as various combinations thereof. The MFs 128 may be configured to support CLIs which may be used to configure the routers 120. The MFs 128 may be configured to support such functions by creating tasks to support the functions, assuring that the tasks supporting the functions remain alive, or the like, as well as various combinations thereof The MEs 127 and associated MFs 128 may be configured to support various other functions configured to support synchronization of the routers 120 to provide the reliable firewall.

The routers 120, as indicated above, have entered a relationship in which PR 120-P is operating as the primary router for providing the reliable firewall and SR 120-S is operating as the secondary router for providing the reliable firewall and, thus, firewall communications are active on the PR 120-P but may be at least partially limited on the SR 120-S. The PR 120-P is further configured such that firewall communications are active on the PR 120-P, which includes communications between the CP 123-P of PR 120-P and the DP 121-P of PR 120-P using (1) a fast-path firewall link (FPFL) 126-P between the DP 121-P and the FE 124-P and (2) a slow-path control link (SPCL) 129-P between the DP 121-P and the ME 127-P. The SR 120-S is further configured such that firewall communications may be at least partially limited on the SR 120-S (e.g., firewall communications related to supporting synchronization of firewall policy information and firewall session state information across the routers 120, firewall communications related to handling of traffic not identified for firewall handling, firewall communications related to providing translation tables for firewall policies (e.g., zone IDs) and session state validation for the firewall state databases of the IDs 122-S, or the like, as well as various combinations thereof).

The routers 120 are configured to provide the reliable firewall based on use of inter-router communications capabilities between the PR 120-P and the SR 120-S.

The primary router 120-P and the secondary router 120-S are communicatively connected via an encrypted link (EL) 130 that is established between the DP 121-P of PR 120-P and the DP 121-S of SR 120-S. The EL 130 may be a tunnel or other suitable type of encrypted link. The EL 130 is configured to transport one or more secure sessions 131 between PR 120-P and SR 120-S. The one or more secure sessions 131 between the PR 120-P and the SR-120-S may include a datapath secure session (DPSS) 131-D between the DP 121-P of PR 120-P and the DP 121-S of SR 120-S. The one or more secure sessions 131 between the PR 120-P and the SR-120-S may include a control plane secure session (CPSS) 131-C between the ME 127-P of PR 120-P and the ME 127-S of SR 120-S (which may be said to be supported by the DPs 121 of the routers 120 since the EL 130 that transports the CPSS 131-C is established between the DPs 121 of the routers 120). The secure sessions 131 may be based on one or more of TCP, UDP, ICMP, IGMP, SCTP, or the like, as well as various combinations thereof. The use of EL 130 between PR 120-P and SR 120-S results in a logically extended datapath for the reliable firewall (namely, although including multiple DPs 121 of multiple routers 120, the multiple DPs 121 of multiple routers 120 appear to be, and operate as, a single datapath for the routers 120 and the reliable firewall provided by the routers 120 such that the datapath of the PR 120-P may be said to span the PR 120-P and the SR 120-S), which also may be referred to herein as a virtual datapath for the reliable firewall.

It will be appreciated that, by directly linking the datapaths of the routers 120, firewall session state information may be rapidly propagated to the routers 120 without requiring use of MEs 127 of the routers 120 to distribute the firewall session state information (which might otherwise introduce additional delay in distribution of firewall session state information). This enables support for firewall session establishment for sessions in which multiple packets are exchanged for the firewall session establishment (e.g., TCP SYN, SYN-ACK, and ACK packets for a TCP connection, the first packets in each direction of a UDP connection, request and response packets of an ICMP session, or the like), for preventing race conditions in which subsequent packets associated with establishment of the firewall session are received at the router before the firewall session state information for the firewall session has been installed at the router. This also enables support for various network configurations which may rely on rapid propagation of firewall session state information of sessions to peered routers due to the possibility of packets of the sessions being received on different routers in different directions (e.g., VRRP or other configurations). It will be appreciated that linking of the datapaths of the routers 120 also enables support for various other capabilities.

It will be appreciated that, although primarily presented with respect to embodiments in which a single secure session is used for connectivity between the data planes of the routers 120 (namely, DPSS 131-D between the DPs 121) and a single secure session is used for connectivity between the control planes of the routers 120 (namely, CPSS 131-C between the MEs 127), multiple secure sessions may be used for connectivity between the data planes of the routers 120, multiple secure sessions may be used for connectivity between the control planes of the routers 120, or the like, as well as various combinations thereof.

It will be appreciated that, although primarily presented with respect to embodiments in which a single EL between the DPs 121 of the routers 120 (illustratively, EL 130) is used to support the connectivity between the data planes of the routers 120 (namely, DPSS 131-D between the DPs 121) and the control planes of the routers 120 (namely, CPSS 131-C between the MEs 127), in at least some embodiments multiple ELs may be used to support the connectivity between the data planes and the control planes of the routers 120. In at least some embodiments, multiple ELs may be used to support connectivity between the data planes of the routers 120 (e.g., multiple secure sessions distributed across multiple ELs, multiple secure sessions supported using the set of multiple ELs as a combination where link redundancy features (e.g., LAG or the like) are applied to maintain connectivity and assure recovery from failure, or the like). In at least some embodiments, multiple ELs may be used to support connectivity between the control planes of the routers 120 (e.g., multiple secure sessions distributed across multiple ELs, multiple secure sessions supported using the set of multiple ELs as a combination where link redundancy features (e.g., LAG or the like) are applied to maintain connectivity and assure recovery from failure, or the like). In at least some embodiments, multiple ELs may be used to support connectivity between the data planes of the routers 120 and the control planes of the routers 120 (e.g., one or more ELs for the secure session between the data planes and one or more ELs for the secure session between the control planes, using the set of multiple ELs as a combination to support secure sessions between the data planes and the control planes where link redundancy features (e.g., LAG or the like) are applied to maintain connectivity and assure recovery from failure, or the like).

The routers 120 are configured to provide the reliable firewall spanning the multiple routers 120. The routers 120 are configured to provide the reliable firewall by supporting negotiation of roles of the routers 120, supporting synchronization of firewall policy information across the routers (e.g., under various conditions, for various types and scopes of firewall policy information, based on various synchronization communication and processing mechanisms, or the like, as well as various combinations thereof), supporting synchronization of firewall session state information across the routers (e.g., under various conditions, for various types and scopes of firewall session state information, based on various synchronization communication and processing mechanisms, or the like, as well as various combinations thereof), supporting failover handling and recovery functions, or the like, as well as various combinations thereof.

The routers 120 are configured to support negotiation of roles in order to agree as to which router will operate as the primary router for the reliable firewall and which router(s) will operate as the secondary router(s) for the reliable firewall. In the example of FIG. 1, PR 120-P has been elected to operate as the primary router and SR 120-S has been elected to operate as the secondary router. This role negotiation may be performed under various conditions, such as when the routers 120 are first deployed and booted, responsive to failure of the primary router for the reliable firewall, responsive to recovery from failure by the primary router for the reliable firewall, or the like.

Figure 2A:
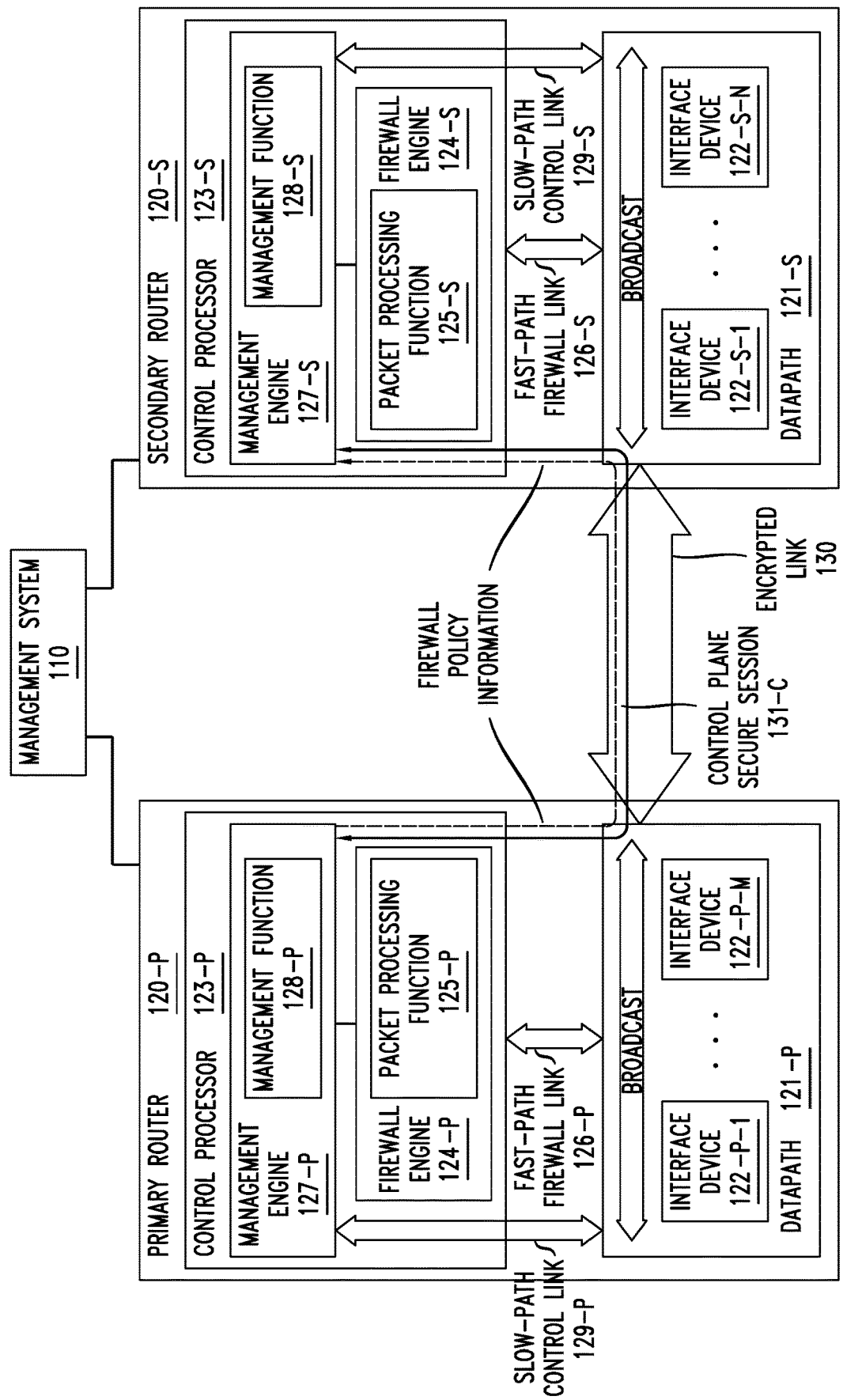
FIGS. 2A and 2B depict the communication system of FIG. 1 for illustrating examples of synchronization of firewall policy information among the multiple routers providing the reliable firewall.
Figure 2B:
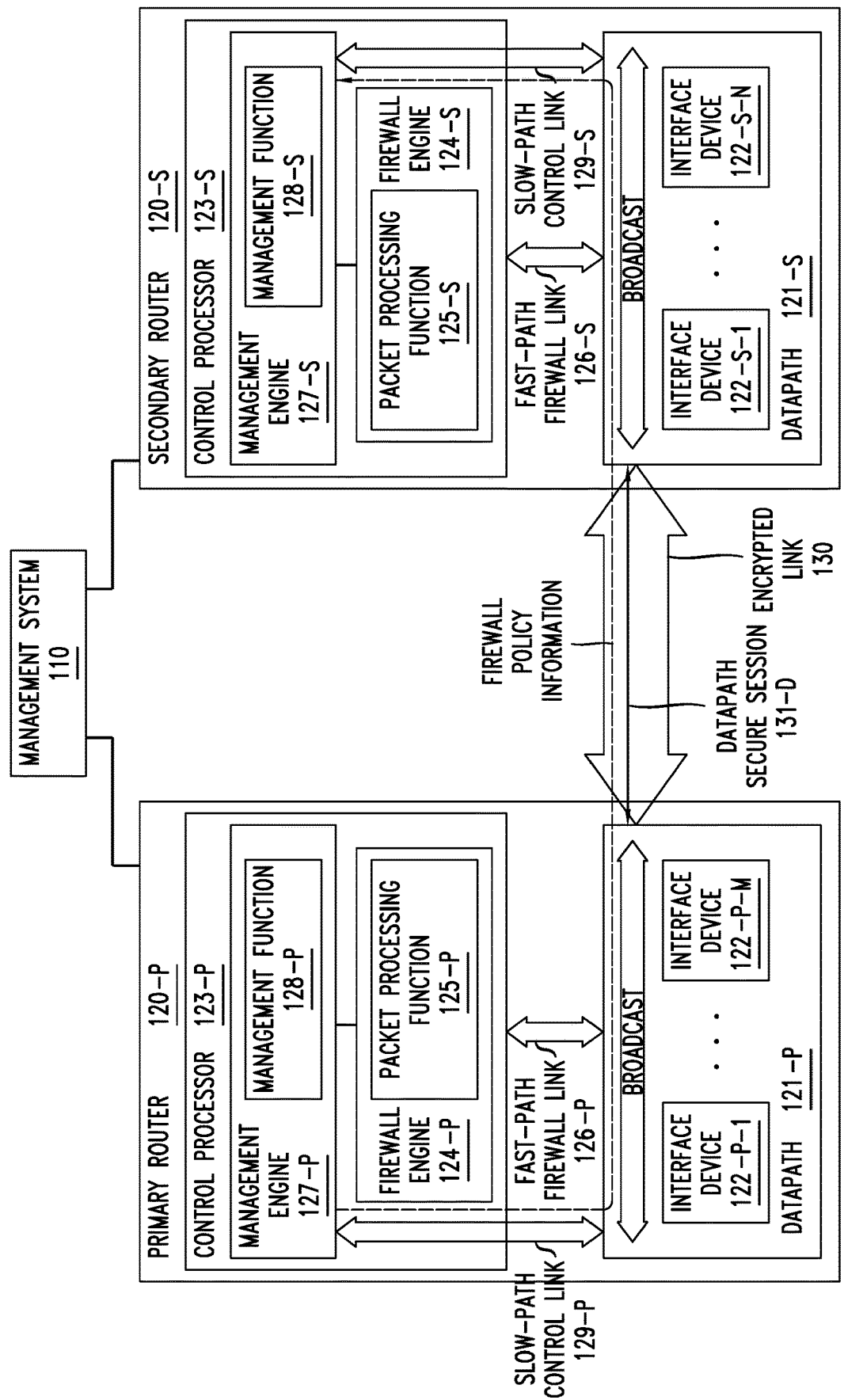

The routers 120 are configured to provide the reliable firewall spanning the multiple routers 120 by supporting synchronization of firewall policy information across the routers 120. The firewall policy information may include firewall policy configuration information (e.g., rules, logging configuration, or the like, as well as various combinations thereof), firewall policy state information (e.g., a count of active established sessions (e.g., for each policy zone, for each rule, or the like, as well as various combinations thereof), the current state of denial-of-service (DoS) mechanisms or distributed DoS (DDoS) prevention mechanisms, the state of any rules enabled or disabled dynamically by the operator for a DoS or DDoS prevention mechanisms, logging activation (e.g., for policy zones, rules, or the like), policy bypass (e.g., for policy zones, rules, or the like)), or the like, as well as various combinations thereof. The firewall policy information may be associated with one or more firewall policies to be applied for the reliable firewall. Examples of synchronization of firewall policy information are illustrated in FIGS. 2A and 2B.

The firewall policy information may be based on a policy design that is purposely designed to be independent of location and router configuration. This policy design is referred to as a zone-based policy. In general, a zone has a set of firewall rules for firewall sessions (e.g., establishment, monitoring, handling, or the like). For example, the firewall rules for a zone may include rules for determining whether a session is to be established, rules related to limitations that are to be placed on a session, rules indicative of special handling for a session (e.g., FTP or the like), rules indicative of monitoring to be performed for a session, or the like, as well as various combinations thereof. A zone-based policy includes the following two elements: (1) a router-independent component that includes the firewall rules and associated policy elements and (2) a router-specific component that includes the assignment of the router-independent component to individual interfaces (e.g., physical interfaces, virtual interfaces, service access points, service delivery points, or the like) on the router 120. The router-specific component of the firewall policy is configured directly (e.g., by MS 110, via CLI, or the like) on each router 120 (e.g., the router-specific component for PR 120-P is configured on PR 120-P and the router-specific component for SR 120-S is configured on SR 120-S). The router-independent component is shared by the routers 120 and is pushed from PR 120-P to the SR 120-S. It is noted that the rules do not reference interfaces and are associated with individual interfaces rather than interface pairs. The interfaces of the routers 120 may be assigned to zones. For a particular session, there may be no zone on the ingress or egress interfaces, a zone on only one of the ingress or egress interfaces, or zones on both the ingress and egress interfaces. In at least some embodiments, if no zones are traversed by a session at the ingress and egress interfaces or the zones traversed by a session at the ingress and egress interfaces are the same, then the reliable firewall may be bypassed. In at least some embodiments, if two different zones are traversed by a session at the ingress and egress interfaces, then the matching rules in each zone may be merged with each other in order to provide the overall policy for the session. It is noted that the rules themselves may be directional and can apply to session establishment in either or both directions relative to the interface. It will be appreciated that other policy designs may be used for the firewall policies.

The routers 120 are configured to support synchronization of existing firewall policy information across the routers 120. The routers 120 may be configured to support synchronization of existing firewall policy information across the routers 120 based on bulk policy synchronization capabilities. The existing firewall policy information may include any firewall policy information previously existing on PR 120-P and, optionally, on SR 120-S. Examples of synchronization of existing firewall policy information are illustrated in FIGS. 2A and 2B.

The existing firewall policy information is configured on PR 120-P. The existing firewall policy information may be configured on PR 120-P by MS 110, via CLI, or the like, as well as various combinations thereof The existing firewall policy information may be configured on PR 120-P when the PR 120-P is first activated, when the PR 120-P is elected as the primary router, when the PR 120-P recovers from a failure to resume operation as the primary router, or the like, and the manner in which the existing firewall policy information is configured on PR 120-P may depend on the condition which causes the existing firewall policy information to be configured on PR 120-P (e.g., configured over time after the PR 120-P is activated, loaded from the flash memory of PR 120-P after recovery from a failure, or the like). The existing firewall policy information may be configured on the PR 120-P by modifying portions of the existing firewall policy information through individual CLI commands which can create, modify, or delete various elements of the firewall configuration on PR 120-P independent of the manner in which those elements were originally created on PR 120-P. The configuration of the existing firewall policy information on PR 120-P may include maintaining existing firewall policy information in a firewall configuration database of MF 128-P (e.g., management of a master copy of the existing firewall policy information by MF 128-P), maintaining existing firewall policy information in a firewall configuration database of PPF 125-P (e.g., for use in session handling, such as for use in session creation and deletion), or the like, as well as various combinations thereof. The existing firewall policy information is synchronized across the PR 120-P and the SR 120-S.

The existing firewall policy information may be synchronized across the PR 120-P and the SR 120-S responsive to various conditions. The existing firewall policy information may be synchronized across the PR 120-P and the SR 120-S based on a determination by PR 120-P that the existing firewall policy information needs to be installed on SR 120-S (e.g., based on a determination that the relationship between PR 120-P and SR 120-S is new, such as where this is the first time these devices have entered into a primary-secondary relationship), based on a determination by PR 120-P that the existing firewall policy information needs to be reinstalled on SR 120-S (e.g., based on a determination that the existing relationship between PR 120-P and SR 120-S has expired, such as where the EL 130 between PR 120-P and SR 120-S was down for more than a threshold length of time), or the like. This determination as to whether the existing firewall policy information needs to be installed or reinstalled on SR 120-S may be performed responsive to various conditions (e.g., activation of the PR 120-P, activation of the SR 120-S, election of the PR 120-P as the primary router for the reliable firewall, recovery after a failure of PR 120-P, recovery after a failure of SR 120-S, recovery of the EL 130 between PR 120-P and SR 120-S, or the like, as well as various combinations thereof). It is noted that PR 120-P alternatively may determine that resynchronization of the existing firewall policy information between PR 120-P and SR 120-S is not required (e.g., based on a determination that, although there was a failure condition, the existing relationship between PR 120-P and SR 120-S did not expire (e.g., such as where the EL 130 between PR 120-P and SR 120-S went down, but was down for less than a threshold length of time)), in which case PR 120-P and SR 120-S may resume their previous relationship without resynchronization.

The existing firewall policy information may be synchronized across the PR 120-P and the SR 120-S in various ways. The existing firewall policy information may be synchronized across the PR 120-P and the SR 120-S by having the PR 120-P load the existing firewall policy information onto the SR 120-S and activate the existing firewall policy information on the SR 120-S. The existing firewall policy information or at least a portion thereof, as illustrated in FIG. 2A, may be sent from ME 127-P to ME 127-S via CPSS 131-C. The existing firewall policy information or at least a portion thereof, as illustrated in FIG. 2B, may be sent from ME 127-P to ME 127-S via the DPSS 131-D (e.g., provided from ME 127-P to DP 121-P via FPFL 126-P on PR 120-P, provided from DP 121-P to DP 121-S via DPSS 131-D, and provided from DP 121-S to ME 127-S via FPFL 126-S on SR 120-S). The ME 127-S, upon receiving the existing firewall policy information from PR 120-P, updates a firewall configuration database of MF 128-S with the existing firewall policy information and updates a firewall configuration database of PPF 125-S with the existing firewall policy information. The existing firewall policy information, or at least a portion thereof, may be sent from PR 120-P to SR 120-S in pre-validated binary form or in any other suitable format.

The existing firewall policy information may be synchronized across the PR 120-P and the SR 120-S based on use of active firewall policies and draft firewall policies on the PR 120-P and the SR 120-S. The use of active and draft firewall policies may provide significant granularity for controlling use of and synchronization of firewall policy information. The active firewall policy is the policy that is active and being used while the draft firewall policy is a separate version of the firewall policy that may be updated to reflect changes in the active firewall policy and then committed to become the active firewall policy. For example, the rules of the firewall policy may have active values and draft values, respectively, with the set of active values providing the active firewall policy and the set of draft values providing the draft firewall policy. The draft firewall policy may then be made the active firewall policy (with the active firewall policy then becoming the draft firewall policy) by toggling between them (e.g., switching an index between 0 and 1). In other words, the draft firewall policy may be considered to be a collection of incrementally modified policy elements that will be applied, at commit, to the active firewall policy. In the case of synchronization of existing firewall policy information, the firewall policy to be used at PR 120-P and SR 120-S may be copied from the active policy on PR 120-P to the draft policy on SR 120-S and, after the elements of the firewall policy have been copied and verified to be correct, PR 120-P may initiate a commit of the draft firewall policy on SR 120-S such that the draft firewall policy on SR 120-S becomes the active firewall policy on SR 120-S and, thus, matches the active firewall policy on PR 120-P. For example, when the entire protected firewall policy is loaded upon a secondary restart event, then, for those protected zones, the active firewall policy on PR 120-P is duplicated into the draft firewall policy on SR 120-S and then the active firewall policy and the draft firewall policy are switched at SR 120-S (e.g., by toggling a 0/1 active/draft selection index for appropriate policy elements on SR 120-S) such that the PR 120-P and the SR 120-S have the same active firewall policies for those zones (i.e., the draft protected zone policies on the SR 120-S have become the active protected zone policies on the SR 120-S). In this manner, the entire firewall policy may be verified before committing the firewall policy on PR 120-P. It will be appreciated that the active and draft firewall policies on the routers 120 may be controlled, modified, and committed in various other ways for supporting synchronization of existing firewall policy information across the routers 120.

The routers 120 are configured to support synchronization of new firewall policy information across the routers 120. The routers 120 may be configured to support synchronization of new firewall policy information across the routers 120 based on incremental policy synchronization capabilities. The new firewall policy information may include any firewall policy information which may result from firewall policy changes. Examples of synchronization of existing firewall policy information are illustrated in FIGS. 2A and 2B.

The new firewall policy information may be the result of firewall policy changes, which may be pushed by the MS 110. The new firewall policy information may be provided by the MS 110 to the PR 120-P or may be generated by the PR 120-P based on policy change information received from the MS 110. The new firewall policy information or at least a portion thereof, as illustrated in FIG. 2A, may be sent from ME 127-P to ME 127-S via CPSS 131-C. The new firewall policy information or at least a portion thereof, as illustrated in FIG. 2B, may be sent from ME 127-P to ME 127-S via the DPSS 131-D (e.g., provided from ME 127-P to DP 121-P via FPFL 126-P on PR 120-P, provided from DP 121-P to DP 121-S via DPSS 131-D, and provided from DP 121-S to ME 127-S via FPFL 126-S on SR 120-S). The new firewall policy information, or at least a portion thereof, may be sent from PR 120-P to SR 120-S in pre-validated binary form or in any other suitable format. The ME 127-S, upon receiving the new firewall policy information from PR 120-P, updates a firewall configuration database of MF 128-S with the new firewall policy information and updates a firewall configuration database of PPF 125-S with the new firewall policy information. It is noted that this new firewall policy information may trigger deletion of firewall sessions associated with any elements of the firewall configuration that have been modified as specified in the new firewall policy information.

The new firewall policy information may be synchronized across the PR 120-P and the SR 120-S based on use of active firewall policies and draft firewall policies on the PR 120-P and the SR 120-S. The use of active and draft firewall policies may provide significant granularity for controlling use of and synchronization of firewall policy information. The active firewall policy is the policy that is active and being used while the draft firewall policy is a separate version of the firewall policy that may be updated to reflect changes in the active firewall policy and then committed to become the active firewall policy. For example, the rules of the firewall policy may have active values and draft values, respectively, with the set of active values providing the active firewall policy and the set of draft values providing the draft firewall policy. The draft firewall policy may then be made the active firewall policy (with the active firewall policy then becoming the draft firewall policy) by toggling between them (e.g., switching an index between 0 and 1). In other words, the draft firewall policy may be considered to be a collection of incrementally modified policy elements that will be applied, at commit, to the active firewall policy. In the case of synchronization of new firewall policy information, the use of the active firewall policy and the draft firewall policy enables changes to be made to the firewall policies on the PR 120-P and the SR 120-S as the changes are received and also enables the changes to be committed on the PR 120-P and the SR 120-S together as a group, at or close to the same time on PR 120-P and SR 120-S, to ensure synchronization of the firewall policy information across PR 120-P and SR 120-S. For example, as new firewall policy information is received by the PR 120-P (e.g., via MS 110 or CLI), PR 120-P marks the change(s) at PR 120-P (e.g., by copying any field(s) of the active rule in the active firewall policy into the corresponding field(s) of the draft rule in the draft firewall policy) and sending the new firewall policy information to the SR 120-S. The SR 120-S receives the new firewall policy information from the PR 120-P and marks the change(s) at SR 120-S (e.g., by copying any field(s) of the active rule in the active firewall policy into the corresponding field(s) of the draft rule in the draft firewall policy). For example, on both the PR 120-P and the SR 120-S, each element of the firewall policy may have both an active value and a draft value that may be selected (e.g., by toggling a 0/1 active/draft selection index for appropriate policy elements) which may be used to handle various types of firewall policy changes (e.g., if a new policy element is added then it has an empty active value and the new value is set in the draft value, if an existing policy element is being deleted then an active value is present but there is no draft value and the active element is marked for deletion using the draft element, if an existing policy element is being modified then an active value is present and the new value is set in the draft value, and so forth). In this manner, as firewall policy changes are provided to PR 120-P, the firewall policy changes may be made and verified on both the PR 120-P and the SR 120-S via the draft firewall policies before the firewall policy changes are committed on the PR 120-P and SR 120-S. It will be appreciated that the active and draft firewall policies on the routers 120 may be controlled, modified, and committed in various other ways for supporting synchronization of existing firewall policy information across the routers 120.

It is noted that the synchronization of new firewall policy information across the routers enables reductions in or minimization of session disruption from firewall policy changes.

The routers 120 are configured to support synchronization of existing firewall policy information and new firewall policy information across the routers 120 contemporaneously (e.g., handling any policy changes which may be effected during synchronization of the existing firewall policy information).

It is noted that synchronization of firewall policy information may enable support for pinholing features. Some protocols (e.g., FTP, TFTP, SIP, or the like) may rely on tracking the state of the protocol as represented in the application-layer payload. This monitoring may be required to provide the pinholing features necessary to allow the protocol to safely establish additional data or media-carrying sessions. These pinholes may be enabled through the dynamic creation of single-use rules. These single-use rules are generated and installed into the firewall policy during the processing of the application-layer payload in the control sessions of the special protocols. In at least some embodiments, in order to support such behavior, such control sessions may be marked by the reliable firewall to redirect the packets of such sessions through the primary firewall engine. Another complication in the handling of such sessions is the need to duplicate/reverse any address translation that has been performed on the control session. Since the address information for establishing the data/media sessions is communicated in the application-layer, the reliable firewall parses and tracks the application layer to collect the information necessary to create the pinhole-enabling dynamic rules with any translations (e.g., NAT, PAT, DNAT, or the like) that may be needed.

It is noted that the routers 120 may be configured to support synchronization of firewall session state information and synchronization of firewall policy information (e.g., existing firewall policy information or new firewall policy information) across the routers 120 contemporaneously (e.g., handling loading and activation of the existing firewall policy information of PR 120-P at SR 120-S and/or synchronization of new firewall policy information at PR 120-P and SR 120-S while continuing to manage existing and new firewall sessions of the reliable firewall).

The routers 120 are configured to provide the reliable firewall spanning the multiple routers 120 by supporting synchronization of firewall session state information across the routers 120. The firewall session state information may include session state information for various sessions of various protocols (e.g., TCP, UDP, ICMP, IGMP, SCTP, or the like, as well as various combinations thereof). The firewall session state information for a firewall session may include, for a given firewall session, firewall session match conditions that may be used to match packets of the firewall session, per-session constraints for the firewall session which may be configured to place constraints on packets of the firewall session, firewall session establishment and termination identification conditions, identification of any firewall policies associated with the firewall session, or the like, as well as various combinations thereof. The firewall session match conditions may include information which may be used to match packets of the firewall session, such as 5-tuples, 6-tuples that include 5-tuples as well as additional information (e.g., one or more service identifiers or other identifiers) that may be used to match packets where virtualization mechanisms (e.g., L2 virtualization, L3 virtualization, or the like, as well as various combinations thereof) are used (e.g., VRF identifiers, VPLS identifiers or the like), or the like. The per-session constraints for the firewall session may include specifications of IP options permitted for the firewall session, selection of a rate policer to rate-limit the firewall session, an indicator that certain packets (e.g., for certain sessions, such as TCP sessions, UDP sessions, or the like) or all packets (e.g., for certain sessions, such as Strict TCP, FTP pinholing/NAT traversal, or the like) of the firewall session are to be directed to the primary firewall instance (namely, FE 124-P), indications of the number of packets matching the firewall session tuple that are permitted (e.g., the number of ICMP requests/responses), the timeout interval for activity on the firewall session, or the like, as well as various combinations thereof. The firewall session establishment and termination identification conditions may be configured for use in determining when the firewall session reaches the established state or the terminated state, may be used to direct packets that would cause a state change (e.g., SYN-ACK, ACK, FIN, RST, or the like for TCP connections) to appropriate modules (e.g., to the primary firewall instance (namely, FE 124-P)) for providing various functions (e.g., monitoring state change, adjusting timeouts, or the like), or the like, as well as various combinations thereof. The firewall session state information stored in the firewall session lookup tables of the IDs 122 may include less or more information, may vary across the various protocols, or the like, as well as various combinations thereof. The firewall session state information may include existing firewall session state information, new firewall session state information, or the like, as well as various combinations thereof.

Figure 3A:
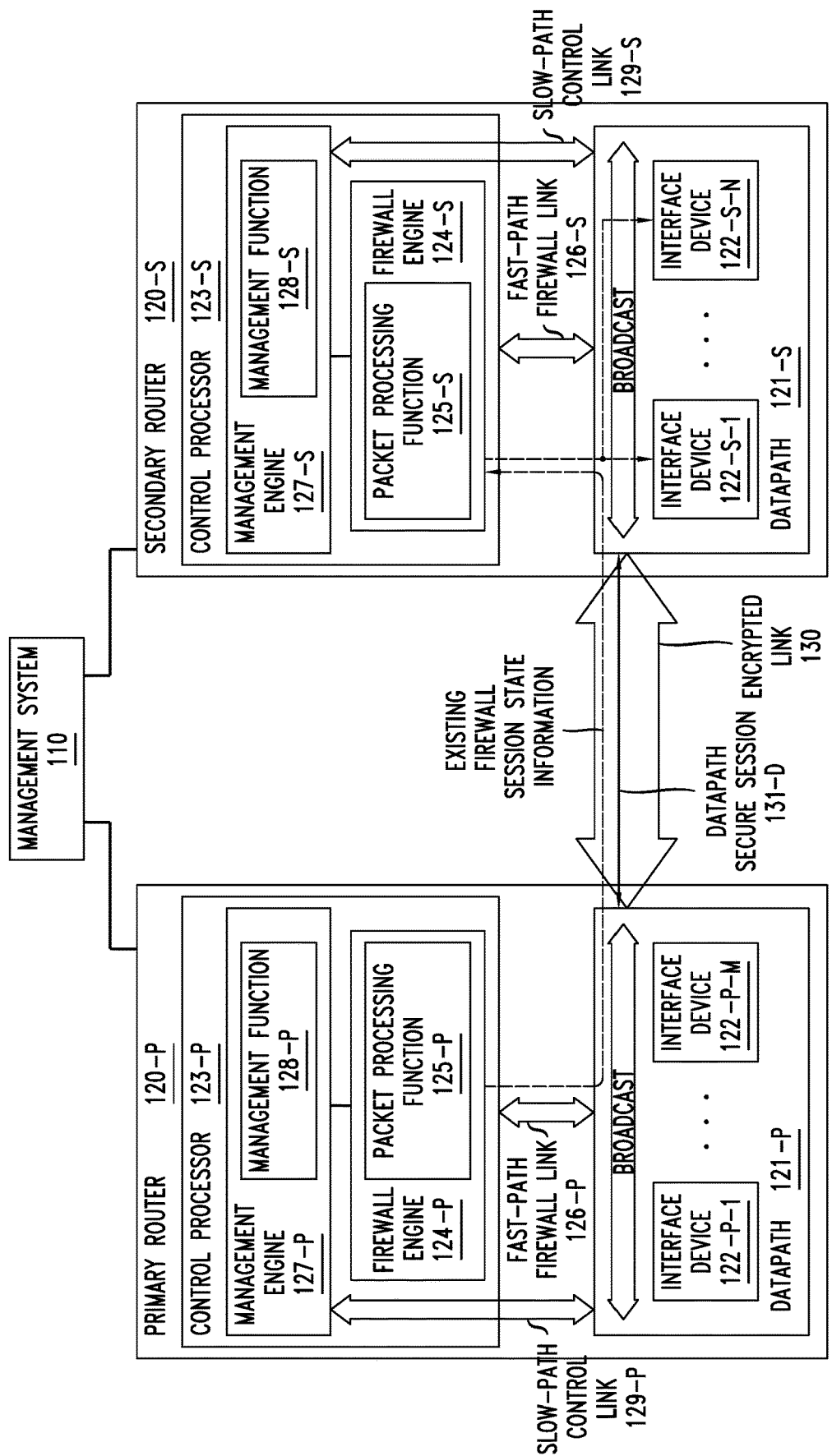
FIGS. 3A and 3B depict the communication system of FIG. 1 for illustrating examples of synchronization of existing firewall session state information among the multiple routers providing the reliable firewall.
Figure 3B:
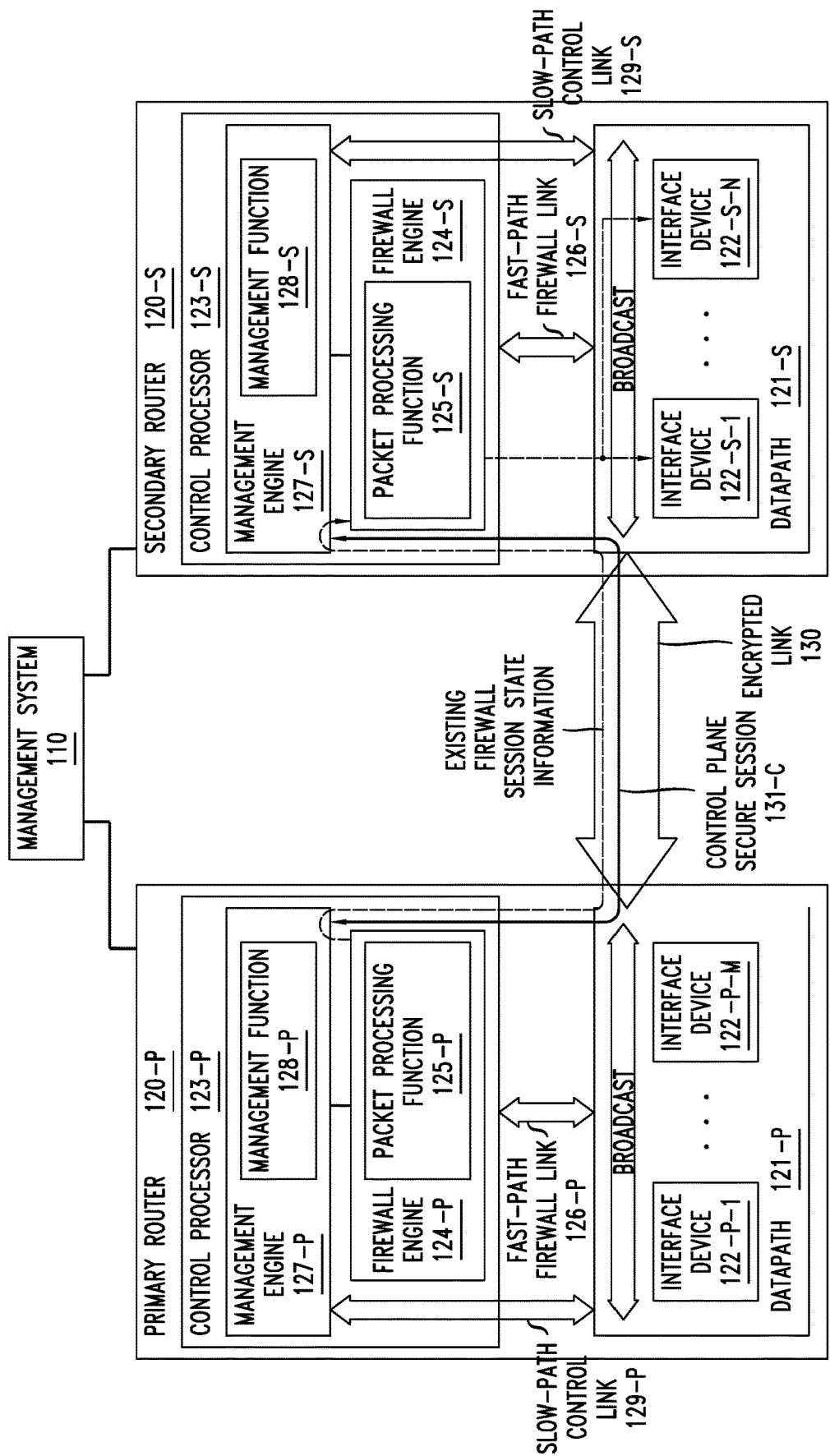

The routers 120 are configured to support synchronization of existing firewall session state information across the routers. The existing firewall session state information may include session state information previously existing on PR 120-P, and, optionally, on SR 120-S, for established firewall sessions. Examples of synchronization of existing firewall session state information are illustrated in FIGS. 3A and 3B.

The existing firewall session state information is configured on PR 120-P. The existing firewall session state information was previously configured on PR 120-P based on establishment of new sessions for the reliable firewall and termination of existing sessions for the reliable firewall. The existing firewall session state information is maintained by the FE 124-P of PR 120-P as session establishment and termination processing which results in creation and updating of firewall session state information is performed by the FE 124-P of PR 120-P. The existing firewall session state information is synchronized across the PR 120-P and the SR 120-S.

The existing firewall session state information may be synchronized across the PR 120-P and the SR 120-S responsive to various conditions. The existing firewall session state information may be synchronized across the PR 120-P and the SR 120-S based on a determination by PR 120-P that the existing firewall session state information needs to be installed on SR 120-S (e.g., based on a determination that the relationship between PR 120-P and SR 120-S is new, such as where this is the first time these devices have entered into a primary-secondary relationship), based on a determination by PR 120-P that the existing firewall session state information needs to be reinstalled on SR 120-S (e.g., based on a determination that firewall policy information has been installed and activated on SR 120-S, such as where the EL 130 between PR 120-P and SR 120-S was down for more than a threshold length of time such that the firewall policy information needs to be resynchronized between PR 120-P and SR 120-S). This determination as to whether the existing firewall session state information needs to be installed or reinstalled on SR 120-S may be performed responsive to various conditions (e.g., activation of the PR 120-P, activation of the SR 120-S, election of the PR 120-P as the primary router for the reliable firewall, recovery after a failure of PR 120-P, recovery after a failure of SR 120-S, recovery of the EL 130 between PR 120-P and SR 120-S, or the like, as well as various combinations thereof). It is noted that PR 120-P alternatively may determine that resynchronization of the existing firewall session state information between PR 120-P and SR 120-S is not required (e.g., based on a determination that, although there was a failure condition, the existing relationship between PR 120-P and SR 120-S did not expire (e.g., such as where the EL 130 between PR 120-P and SR 120-S went down, but was down for less than a threshold length of time)), in which case PR 120-P and SR 120-S may resume their previous relationship without resynchronization. It is noted that, where existing firewall policy information is synchronized across the PR 120-P and the SR 120-S, the activation of the existing firewall policy information on the SR 120-S causes termination of existing firewall sessions on SR 120-S such that the existing firewall session state information of those sessions will then be resynchronized from the PR 120-P to the SR 120-S.

The existing firewall session state information may be synchronized across the PR 120-P and the SR 120-S in various ways. The existing firewall session state information may be synchronized across the PR 120-P and the SR 120-S by having the PR 120-P load the existing firewall session state information into the SR 120-S. The existing firewall session state information is sent from PR 120-P to SR 120-S, where it is installed onto the FE 124-S (e.g., in a firewall engine database of the FE 124-S) and then downloaded from the FE 124-S to the IDs 122-S (e.g., into firewall session tables on the IDs 122-S). The existing firewall session state information, as illustrated in FIG. 3A, may be provided from the PR 120-P to the SR 120-S by providing the existing firewall session state information from the FE 124-P to the FE 124-S via the DPSS 131-D (illustratively, from FE 124-P to DP 121-P, from DP 121-P to DP 121-S via DPSS 131-D, and from DP 121-S to FE 124-S via FPFL 126-S). The existing firewall session state information, as illustrated in FIG. 3B, may be provided from the PR 120-P to the SR 120-S by providing the existing firewall session state information from the FE 124-P to the FE 124-S via the CPSS 131-C (illustratively, from FE 124-P to ME 127-P on PR 120-P, from ME 127-P on PR 120-P to ME 127-S on SR 120-S via CPSS 131-C, and from ME 127-S to FE 124-S on SR 120-S). The synchronization of the existing firewall session state information across the PR 120-P and the SR 120-S results in firewall session tables on the IDs 122-S of SR 120-S that, for protected zones, match the firewall session tables on the IDs 122-P of the PR 120-P, thereby providing an extended datapath configured to support handling of sessions on PR 120-P and SR 120-S.

Figure 4A:
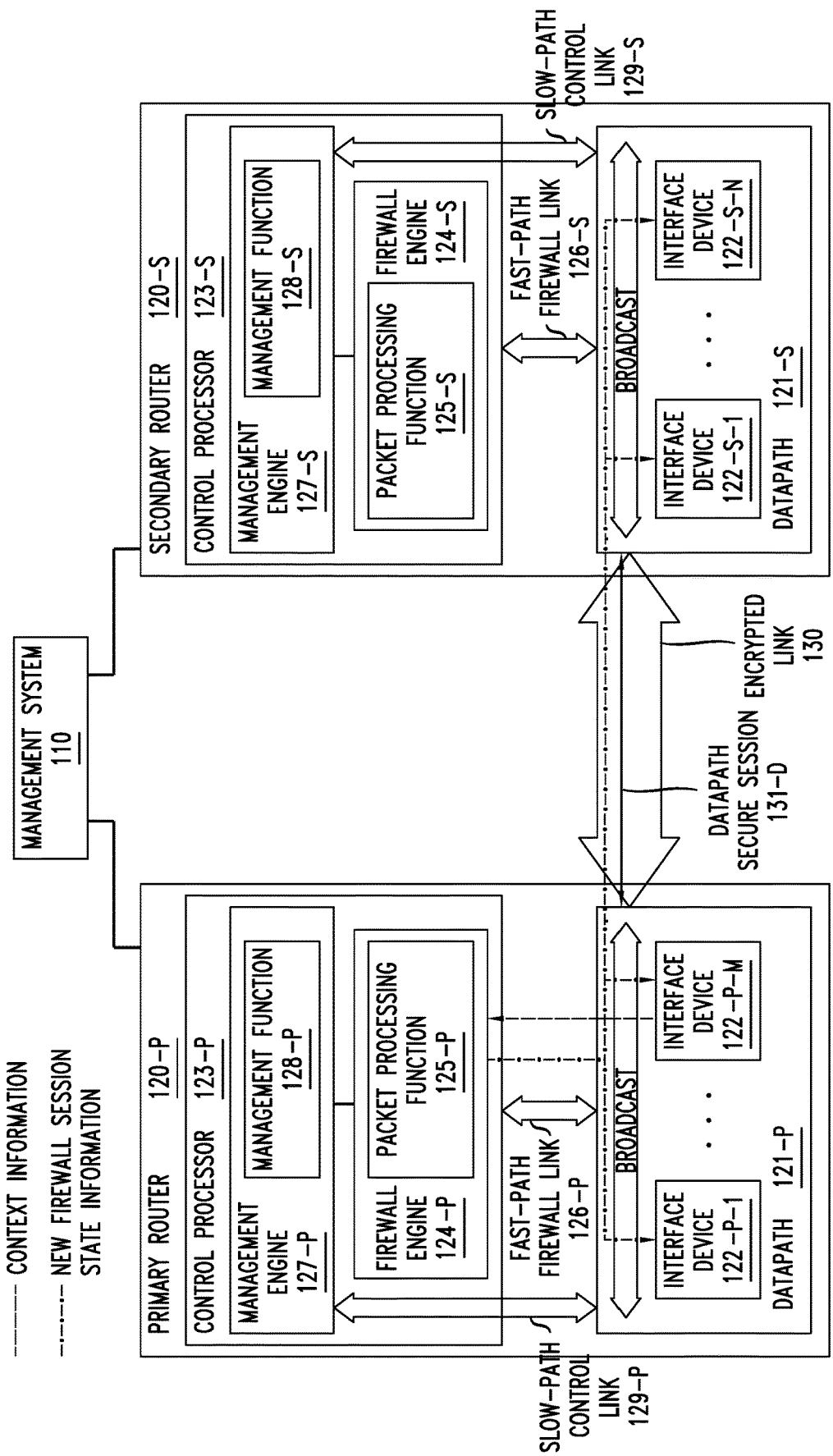
FIGS. 4A and 4B depict the communication system of FIG. 1 for illustrating examples of synchronization of new firewall session state information among the multiple routers providing the reliable firewall.
Figure 4B:
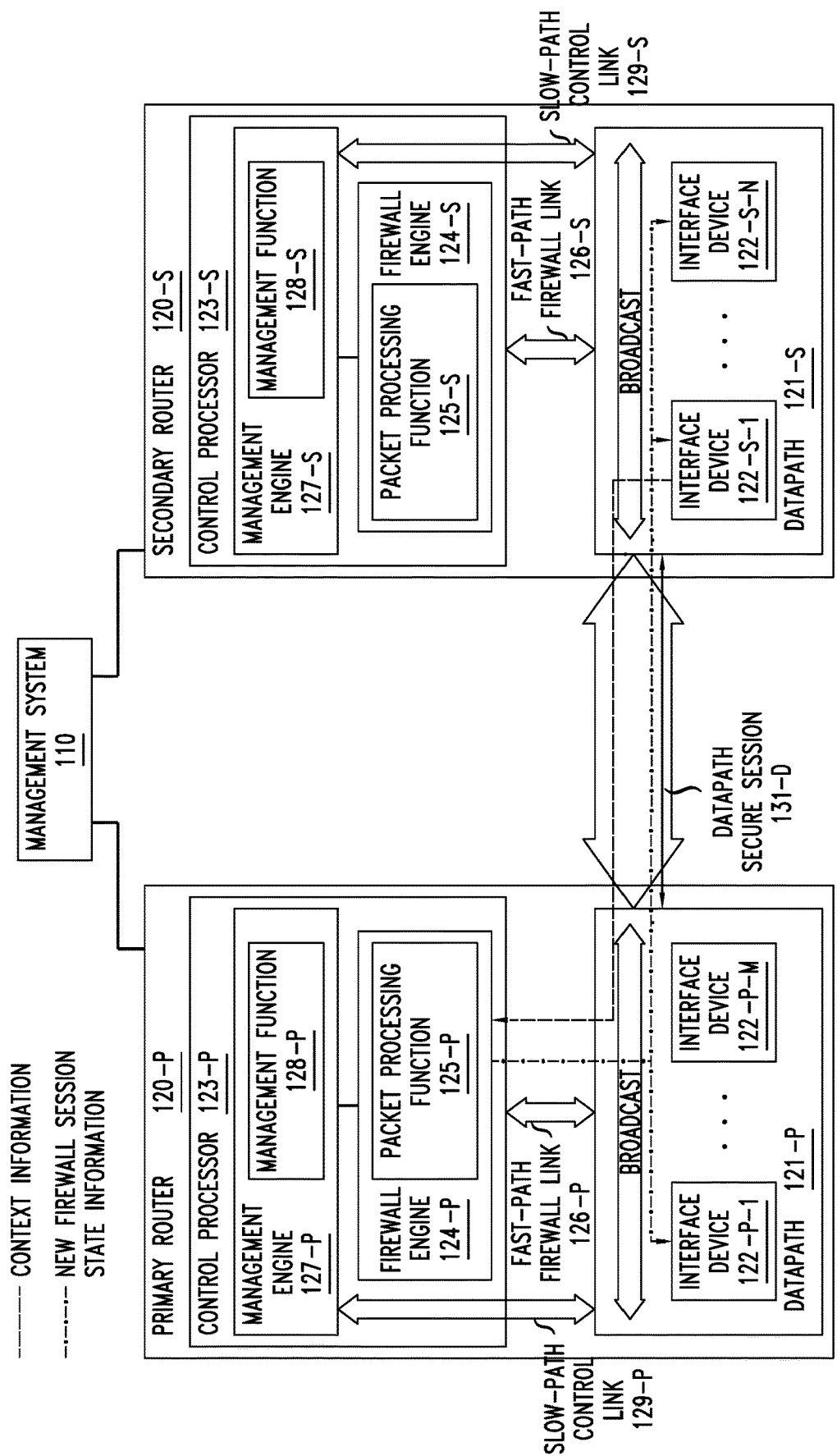

The routers 120 are configured to support synchronization of new firewall session state information across the routers. The new firewall session state information may be the result of establishment of new firewall sessions for the reliable firewall, modifications of existing firewall sessions of the reliable firewall (e.g., state changes or the like), termination of existing firewall sessions of the reliable firewall, or the like, as well as various combinations thereof. Examples of synchronization of new firewall session state information are illustrated in FIGS. 4A and 4B.

At PR 120-P or SR 120-S, when a packet is received by an ID 122 of the router 120, a determination is made on the ID 122 as to whether the packet is to be extracted to the primary firewall instance (namely, FE 124-P of PR 120-P) for handling. The determination as to whether the packet is to be extracted to the primary firewall instance may be based on the firewall session table of the ID 122. The determination as to whether the packet is to be extracted to the primary firewall instance may be based on a determination as to whether the packet matches an existing session at the ID 122 (e.g., whether or not the packet matches an entry in the firewall session table of the ID 122), whether the packet is a type of packet of an existing firewall session that is to be extracted to the primary firewall instance for handling (e.g., a packet requesting modification or termination of an existing firewall session, which may be indicated in the entry of firewall session table of the ID 122 for the existing firewall session), whether the packet is a packet of a firewall session for which all packets are to be extracted to the primary firewall for handling (e.g., a Strict TCP session, an FTP session, or the like, which may be indicated in the entry of firewall session table of the ID 122 for the existing firewall session), or the like. It is noted that here, extraction to the primary firewall instance generally involves providing context information for the packet from the ID 122 to the primary firewall instance and may or may not include providing the packet (e.g., the original packet or a copy of the packet) or portions thereof to the primary firewall instance. If a determination is made that the packet is not to be extracted to the primary firewall instance, then the ID 122 handles the packet locally (e.g., modified if needed (e.g., for network address translation (NAT) or other types of modification), forwarded toward its intended destination, or the like, as well as various combinations thereof). If a determination is made that the packet is to be extracted to the primary firewall instance (e.g., the packet does not match an existing firewall session or the like), the ID 122 determines context information for the firewall session (namely, a firewall session to be established, modified, or terminated) and provides the context information for the firewall session to the primary firewall instance (with or without providing the packet or portions thereof) for use in firewall session handling processing (e.g., establishing a new firewall session, modifying an existing firewall session, terminating an existing firewall session, or the like). It is noted that use of the firewall session tables of the IDs 122 to control extraction of packets to the primary firewall instance supports efficient and flexible handling of packet extraction (for firewall session handling) without negatively impacting performance of the routers 120 or established firewall sessions traversing the routers 120.

The ID 122 that receives the packet and determines that the packet is to be extracted to the primary firewall instance determines the context information and sends the context information (with or without associated packet information) to the primary firewall instance. The context information may include an indication of the reason that the context information is being provided (e.g., new firewall session, state change, MSS modification, logging, of the like), an indication of the contents of the context information (which may vary for different conditions which trigger sending of the context information), an indication of the router originating the context information (e.g., router ID, router address, or the like), an indication of the router for which the context information is intended, policy zone identifiers (e.g., source, destination, transit, or the like), a source interface identifier, a service instance identifier (e.g., VRRP ID, VPRN ID, VPLS ID, or the like), an indication of a firewall session with which the context information is associated (e.g., session ID) if the firewall session is an existing firewall session, or the like, as well as various combinations thereof. The context information may be sent from the ID 122 to the primary firewall instance by including the context information within a fabric header. The ID 122 also may send to the primary firewall instance, along with the context information, packet information which may include the packet or a copy of the packet, a copy of portions of the packet, or the like. For example, where the packet or a copy of the packet is sent, the fabric header may be used to encapsulate the packet or the copy of the packet. For example, where a portion of the packet is sent, the fabric header may be used to encapsulate a payload that includes the portion of the packet. The context information (and, optionally, packet information) may be sent from the ID 122 to the primary firewall instance via the datapath. For example, in the case in which the packet was received on an ID 122-P of PR 120-P, as depicted in FIG. 4A, the context information (and, optionally, packet information) may be provided to the FE 124-P of the PR 120-P by providing the context information (and, optionally, packet information) from the ID 122-P to the FE 124-P via the FPFL 126-P. For example, in the case in which the packet was received on an ID 122-S of SR 120-S, as depicted in FIG. 4B, the context information (and, optionally, packet information) may be provided to the FE 124-P of the PR 120-P by providing the context information (and, optionally, packet information) from the ID 122-S of SR 120-S to the DP 121-P of PR 120-P via the DPSS 131-D and by providing the context information (and, optionally, packet information) from the DP 121-P of the PR 120-P to the FE 124-P via the FPFL 126-P after the context information (and, optionally, packet information) is received by the PR 120-P. It is noted that, here, despite being received on SR 120-S, session handling processing is performed on PR 120-P. The context information (and, optionally, packet information) may be sent from the ID 122 to the primary firewall instance via the datapath based on various internal data routing mechanisms (e.g., internal Ethernet, internal TCP connections, internal UDP-based forwarding, or the like). It will be appreciated that the context information may be transferred from the ID 122 on which the packet is received to the FE 124-P on PR 120-P in various other ways (e.g., using other data structures, messages, paths, data routing mechanisms, or the like, as well as various combinations thereof). The determination and forwarding of the context information by the ID 122 may be performed based on the firewall session table of the ID 122.

The fabric header that is used for transporting the context information (and, optionally, for supporting transport of the packet information) may take various formats. The fabric header may include one or more fields which may be used to transport the context information (and, optionally, to support transport of the packet information). For example, the fabric header may include one or more fields which may include tuples (e.g., 3-tuples, 5-tuples, or the like) which identify the associated firewall session, one or more fields which may be used to identify each direction of the firewall session, one or more fields including information associated with handling packets of the firewall session, or the like, as well as various combinations thereof. The structure of the fabric header may be a header structure that is known and agreed to by the routers 120 for facilitating the transfer of the context information (and, optionally, packet information) between the routers 120. For example, as indicated above, the PR 120-P and SR 120-S may store various rules for handling transfer of the context information (and, optionally, packet information) between the routers 120 based on use of fabric headers agreed to by the routers 120. It will be appreciated that various other types of header structures may be used to facilitate transfer of the context information (and, optionally, packet information) between the routers 120.

The FE 124-P receives the context information of the firewall session from the ID 122 and determines handling of the firewall session based on processing of the context information of the firewall session (e.g., establishment of the firewall session where the received packet is indicative of a request for a new firewall session, modification of the firewall session where the received packet is indicative of a modification to an existing firewall session, termination of the firewall session where the received packet is indicative of a request for or condition triggering termination of the firewall session, or the like). The determined handling of the firewall session results in creation of new firewall session state information at the FE 124-P, which is then distributed within the logically extended datapath (namely, to IDs 122-P of DP 121-P of PR 120-P and to IDs 122-S of DP 121-S of SR 120-S). It will be appreciated that the new firewall session state information that is created and distributed may depend on the state of the firewall session (e.g., match and processing information for established or modified firewall sessions, match and drop conditions for firewall sessions that were denied establishment, or the like). For example, for a new firewall session that is established, the new firewall session state information for the firewall session may include firewall session match conditions that may be used to match packets of the firewall session, per-session constraints for the firewall session which may be configured to place constraints on packets of the firewall session, firewall session establishment and termination identification conditions, identification of any firewall policies associated with the firewall session, or the like, as well as various combinations thereof. For example, for an existing firewall session that is modified, the new firewall session state information for the firewall session may include modified per-session constraints for the firewall session which may be configured to place constraints on packets of the firewall session, modified firewall session termination identification conditions, modification of firewall policies associated with the firewall session, or the like, as well as various combinations thereof. For example, for an existing firewall session that is terminated, the new firewall session state information for the firewall session may include session state information associated with graceful termination of the firewall session. It will be appreciated that the firewall session state information may include various other types of information.

The FE 124-P, after determining handling of the firewall session that results in creation of the new firewall session state information, initiates distribution of the new firewall session state information within the logically extended datapath (namely, to IDs 122-P of DP 121-P of PR 120-P and to IDs 122-S of DP 121-S of SR 120-S).

The new firewall session state information may be distributed within the logically extended datapath by providing the new firewall session state information from FE 124-P to DP 121-P of PR 120-P (which then distributes the new firewall session state information to the IDs 122-P of DP 121-P of PR 120-P based on broadcast capabilities of the DP 121-P) and by providing the new firewall session state information from the FE 124-P to the DP 121-S of PR 120-S (which then distributes the new firewall session state information to the IDs 122-S of DP 121-S of PR 120-S based on broadcast capabilities of the DP 121-S). The FE 124-P may provide the new firewall session state information from the FE 124-P to the DP 121-P of PR 120-P via the FPFL 126-P. The FE 124-P may provide the new firewall session state information from the FE 124-P to the DP 121-S of PR 120-S via the DPSS 131-D (illustratively, from FE 124-P to DP 121-P and from DP 121-P to DP 121-S via broadcasting of the new firewall session state information from DP 121-P to DP 121-S), via the CPSS 131-C (illustratively, from FE 124-P to ME 127-P on PR 120-P, from ME 127-P to ME 127-S via CPSS 131-C, from ME 127-S to FE 124-S on SR 120-S, and from the FE 124-S to the DP 121-S on SR 120-S via downloading of the new firewall session state information from FE 124-S to DP 121-S), or the like. The DP 121-S of the SR 120-S, upon receiving the firewall session state information for the firewall session, broadcasts the firewall session state information for the firewall session to each of the IDs 122-S of SR 120-S. In this manner, the firewall session state information for the firewall session is distributed across each of the IDs 122 of the reliable firewall even though the reliable firewall has a logically extended datapath spanning multiple routers 120. An example of synchronization of new firewall session state information in this manner is illustrated in FIG. 4A (for a packet received on PR 120-P) and FIG. 4B (for a packet received on SR 120-S). It is noted that use of the DPSS 131-D for handling synchronization of new firewall session state information may reduce or even minimize processing overhead and queuing delay associated with handling of various firewall sessions under various conditions. It is noted that distribution of the same firewall session state information to the peered routers of the reliable firewall may be facilitated by use of zone-based policies that allow the same rule sets to be applied to any interfaces of PR 120-P and SR 120-S. It is noted that, since the firewall session state information for the firewall session is meaningful on each of the routers 120 of the reliable firewall, the firewall session may be supported even where the firewall session may traverse different routers 120 in opposite directions (e.g., TCP sessions supporting VRRP).

The new firewall session state information may be distributed within the logically extended datapath by including the new firewall session state information within a fabric header. The FE 124-P also may provide to the logically extended datapath (for return to the ID 122 that originally received the packet which triggered creation of the new firewall session state information), along with the new firewall session state information, packet information which may include the packet information received by the FE 124-P or a modified version of the packet information received by the FE 124-P (e.g., the packet received by FE 124-P, a portion of the packet received by FE 124-P, the packet copy received by FE 124-P, a portion of the packet copy received by FE 124-P, or the like). For example, where the packet or a copy of the packet was received by FE 124-P and is to be provided back to the ID 122 that originally received the packet, the fabric header may be used to encapsulate the packet or the copy of the packet. For example, where a portion of the packet was received by FE 124-P and is provided back to the ID 122 that originally received the packet, the fabric header may be used to encapsulate a payload that includes the portion of the packet. The new firewall session state information (and, optionally, packet information) may be sent from the ID 122 to the primary firewall instance via the datapath based on various internal data routing mechanisms (e.g., internal Ethernet, internal TCP connections, internal UDP-based forwarding, or the like). It will be appreciated that the new firewall session state information may be transferred from the ID 122 on which the packet is received to the FE 124-P on PR 120-P in various other ways (e.g., using other data structures, messages, paths, data routing mechanisms, or the like, as well as various combinations thereof). It will be appreciated that the packet information may be returned to the ID 122 on which the packet was originally received for various purposes (e.g., routing toward the intended destination, triggering of one or more other control actions, or the like, as well as various combinations thereof).

The fabric header that is used for transporting the firewall session state information (and, optionally, for supporting transport of the packet information) may take various formats. The fabric header may include one or more fields which may be used to transport the firewall session state information (and, optionally, to support transport of the packet information). For example, the fabric header may include one or more fields which may include tuples (e.g., 3-tuples, 5-tuples, or the like) which identify the associated firewall session, one or more fields which may be used to identify each direction of the firewall session, one or more fields including information associated with handling packets of the firewall session, or the like, as well as various combinations thereof. The structure of the fabric header may be a header structure that is known and agreed to by the routers 120 for facilitating the transfer of the firewall session state information (and, optionally, packet information) between the routers 120. For example, as indicated above, the PR 120-P and SR 120-S may store various rules for handling transfer of the firewall session state information (and, optionally, packet information) between the routers 120 based on use of fabric headers agreed to by the routers 120. It will be appreciated that various other types of header structures may be used to facilitate transfer of the firewall session state information (and, optionally, packet information) between the routers 120.

It is noted that, although primarily presented herein with respect to embodiments in which a single fabric header layout is used for transfer of context information from the IDs 122 to the FE 124-P and for transfer of the firewall session state information from the FE 124-P to the IDs 122, in at least some embodiments multiple fabric header layouts may be used (e.g., agreed to by PR 120-P and SR 120-S (e.g., based on storage of respective rules or rule sets for the respective headers in the firewall session tables of the IDs 122 of the routers)) for various purposes. In at least some embodiments, for example, multiple fabric header layouts may be used for transfer of context information from the IDs 122 to the FE 124-P and for transfer of the firewall session state information from the FE 124-P to the IDs 122. In at least some embodiments, for example, multiple fabric header layouts may be used for transfer of context information from the IDs 122 where the context information is sent responsive to different types of packets received at the IDs 122. In at least some embodiments, for example, multiple fabric header layouts may be used for transfer of firewall session state information to the IDs 122 where the firewall session state information is sent responsive to different types of packets received at the IDs 122. It will be appreciated that various combinations of such fabric header layouts may be used.

The IDs 122, upon receiving the firewall session state information for the new firewall session, update the firewall session tables to maintain the firewall session state information of the new firewall session, such that each ID 122 of the reliable firewall (i.e., IDs 122-P of PR 120-P as well as IDs 122-S of SR 120-S) is capable of handling subsequent packets of the new firewall session.

The routers 120 are configured to support synchronization of existing firewall session state information and new firewall session state information across the routers 120 contemporaneously (e.g., handling establishment of new sessions and termination of existing sessions in conjunction with synchronization of the existing firewall session state information).

It is noted that the routers 120 may be configured to support synchronization of firewall policy information and firewall session state information (e.g., existing firewall session state information or new firewall session state information) across the routers 120 contemporaneously (e.g., handling synchronization of existing firewall session state information and/or synchronization of new firewall session state information) while continuing to support synchronization of firewall policy information).

It is noted that the routers 120 may be configured to support synchronization of firewall policy information (e.g., existing firewall policy information or new firewall policy information) and synchronization of firewall session state information across the routers 120 contemporaneously (e.g., continuing to manage existing and new firewall sessions of the reliable firewall while also handling loading and activation of the existing firewall policy information of PR 120-P at SR 120-S and/or synchronization of new firewall policy information at PR 120-P and SR 120-S).

The routers 120 are configured to provide the reliable firewall spanning the multiple routers 120 based on synchronization of the routers 120 providing the reliable firewall. The synchronization of the routers 120 providing the reliable firewall enables the reliable firewall to support various failure and recovery scenarios which make the reliable firewall highly reliable. If the CP 123-P of the PR 120-P fails, the CP 123-S of the SR 120-S assumes the role of the primary and continues to support sessions of the reliable firewall using the extended datapath spanning the PR 120-P and the SR 120-S. If EL 130 between the PR 120-P and SR 120-S is lost, the SR 120-S may attempt to become the primary for the reliable firewall and active sessions will continue to be maintained while SR 120-S changes from being the secondary to being the primary. In such situations, synchronization of the routers 120 enables the switchover from PR 120-P to SR 120-S to be performed with minimal disruptions to established sessions and with minimal delay in establishing new sessions. It will be appreciated that various other failure scenarios may be supported.

It will be appreciated that, although primarily presented herein with respect to embodiments in which the reliable firewall includes two firewall instances provided on two router instances (illustratively, FE 124-P on PR 120-P and FE 124-S on SR 120-S), the reliable firewall may include any number of firewall instances provided on any number of router instances. For example, the reliable firewall may be deployed as two or more firewall instances hosted on the same router or routers and serving different virtualized service instances (e.g., VPRNs or the like). For example, there may be a primary router instance for each firewall instance and a secondary router instance for each firewall instance, where the primary and secondary router instances may be arranged such that, for each firewall instance, the primary and secondary router instances may be different (e.g., the primary router instance for one firewall instance may be the secondary router instance for another firewall instance). It will be appreciated that at least some such embodiments may be used to support multiple VRRP instances spanning several routers.

It will be appreciated that, although primarily presented herein with respect to embodiments in which the routers 120 providing the reliable firewall each include only a single router instance (illustratively, CP 123-P of PR 120-P and CP 123-S of SR 120-S), one or more of the routers 120 providing the reliable firewall may include multiple router instances (e.g., an active CP 123 and an inactive, backup CP 123). For example, PR 120-P, in addition to the CP 123-P that is operating as an active CP for PR 120-P, also may include a second CP configured as a backup to the CP 123-P. Similarly, for example, SR 120-S, in addition to the CP 123-S that is operating as an active CP for SR 120-S, also may include a second CP configured as a backup to the CP 123-S. It will be appreciated that the use of such backup CPs within the routers 120 may provide additional resiliency and, thus, reliability, for the reliable firewall. For example, if the active CP within a secondary router fails, then the inactive CP within the secondary router will take over the responsibilities of the former active CP of the secondary router. Since the firewall functions of the datapath of the secondary router are under the control of the primary router, the established sessions of the reliable firewall continue to operate normally. The newly active CP of the secondary router will establish secure sessions with the CP of the primary router and will continue maintaining synchronization of the reliable firewall. It will be appreciated that various other failure scenarios may be supported.

It will be appreciated that the routers 120 may be configured in various other ways for supporting a reliable firewall spanning the routers 120.

FIG. 5 depicts an example embodiment of a method for use by a primary router to support synchronization of firewall policy information among multiple routers providing a reliable firewall. At block 501, method 500 begins. At block 510, the primary router, which supports a firewall policy, determines, based on firewall policy information, a change to the firewall policy at the primary router. At block 520, the primary router sends, toward a secondary router, the firewall policy information. At block 530, the primary router applies the change to the firewall policy at the primary router. At block 540, the primary router sends, toward the secondary router, an indication of application of the change to the firewall policy at the primary router. At block 599, method 500 ends.

FIG. 6 depicts an example embodiment of a method for use by a secondary router to support synchronization of firewall policy information among multiple routers providing a reliable firewall. At block 601, method 600 begins. At block 610, the secondary router receives, from a primary router, firewall policy information associated with a firewall policy. At block 620, the secondary router determines, based on the firewall policy information, a change to the firewall policy. At block 630, the secondary router receives, from the primary router, an indication of application of the change to the firewall policy at the primary router. At block 640, the secondary router applies, based on the indication of application of the change to the firewall policy at the primary router, the change to the firewall policy at the secondary router. At block 699, method 600 ends.

Figure 7:
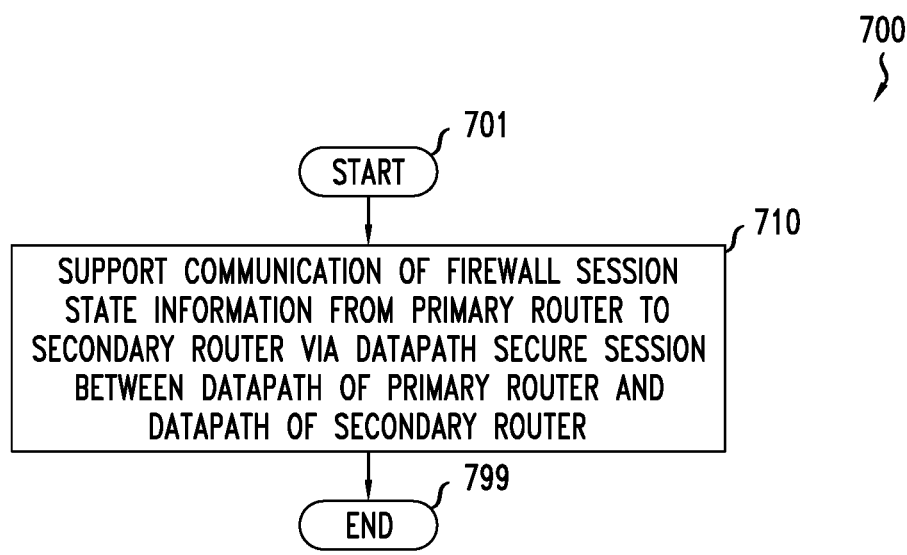
FIG. 7 depicts an example embodiment of a method for use by a router to support synchronization of firewall session state information among multiple routers providing a reliable firewall.

FIG. 7 depicts an example embodiment of a method for use by a router to support synchronization of firewall session state information among multiple routers providing a reliable firewall. At block 701, method 700 begins. At block 710, the router supports communication of firewall session state information from a primary router to a secondary router via a datapath secure session between a datapath of the primary router and a datapath of the secondary router. The router may be the primary router or may be the secondary router. At block 799, method 700 ends.

It will be appreciated that, although primarily presented herein with respect to embodiments in which session establishment is performed on the primary router and the associated firewall session state information is distributed from the primary router to the datapaths of the primary router and the secondary router, in at least some embodiments session establishment may be performed on the secondary router (e.g., for new session requests that arrive on the secondary router rather than the primary router) and the associated firewall session state information may be distributed from the secondary router to the datapaths of the secondary router and the primary router.

It will be appreciated that, although primarily presented herein within the context of providing a reliable firewall spanning two router instances including a primary router instance and a secondary router instance, in at least some embodiments a reliable firewall may span more than two router instances including a primary router instance and multiple secondary router instances. In at least some such embodiments, various embodiments of the reliable firewall spanning a primary router instance and multiple secondary router instances may be configured to support various failure and recovery scenarios. If the encrypted link between a primary router and one of the secondary routers is lost and cannot be reestablished and that secondary router is in contact with other secondary routers that have also lost contact with the primary router, then the secondary routers will elect a new primary router. Until a new primary router is elected, existing sessions will be maintained, but new sessions may not be established. Once the new primary router is elected, the datapaths and the control planes of the newly elected primary router and the other secondary routers will be connected and new sessions may be established and distributed. It will be appreciated that various other failure scenarios may be supported.

It will be appreciated that, although primarily presented herein within the context of providing a reliable firewall spanning multiple router instances in which each of the router instances, including the primary router instance, supports routing/switching functions in the data plane, in at least some embodiments the primary router instance may be a router controller that does not support routing/switching functions in the data plane.

It will be appreciated that, although primarily presented herein within the context of providing a reliable firewall that does not support network address translation (NAT) functions, various embodiments presented herein for providing a reliable firewall may be adapted for use in providing a reliable firewall that does support NAT functions (which also may be referred to herein as a reliable firewall/NAT). It will be appreciated that, although primarily presented herein within the context of providing a reliable firewall that does not support NAT functions, various embodiments presented herein for providing a reliable firewall may be adapted for use in providing a reliable NAT element that does not support firewall functions (which also may be referred to herein as a reliable NAT element). It will be appreciated that, although primarily presented herein within the context of providing a reliable firewall and/or NAT element, various embodiments presented herein may be adapted for use in providing a reliable security elements or appliances supporting various other security functions.

It will be appreciated that various embodiments of the reliable firewall presented herein may be configured to support various high availability and multipath routing relationships for various types of virtual services (e.g., VRRPs, VPRNs, VPLSs, or the like, as well as various combinations thereof) which may involve various combinations of high availability and multipath routing peers. In at least some embodiments, a protected service may have at least two service endpoints on each of the primary and secondary routers and the service endpoints may be connected via various types of communication channels (e.g., MPLS tunnels or other types of communication channels which may be carried by multiplexing or non-multiplexing mechanisms) which may be identified within the routers as being associated with a particular service instance. In at least some embodiments, in the control plane, policy zones may be associated with these more general service endpoints of a protected service and the policy zones may be uniquely associated with a particular service instance (e.g., a policy zone may belong to a single service instance and multiple policy zones may belong to a particular service instance), such that all that may be needed to protect a service instance with high availability is to identify that service instance (since the configuration and endpoint information may then be associated with the service instance automatically since they may be marked as belonging to the service instance). In at least some embodiments, in the datapath, each policy zone may be associated with a single service instance and each session entry in the firewall session table in the ID is marked with the service instance with which it is associated, such that it may only be necessary to mark the policy zone object in the datapath with the identification of the other router in the high availability relationship and whether or not the router is the primary router or secondary router in the relationship. It is noted that at least some such embodiments enable an arbitrary number of high availability relationships to be created for individual services where the high availability relationships may involve different high availability peers.

It will be appreciated that various embodiments of the reliable firewall presented herein may be configured to support various virtual service support scenarios for various types of virtual services (e.g., VRRPs, VPRNs, VPLSs, or the like, as well as various combinations thereof). In at least some embodiments, a single router may be involved in one or more high availability relationships with other routers to protect service instances, where the datapath session objects may identify the zone(s) to which the sessions belong and whether the primary router is the local or remote router and where the datapath zone configuration provides the IP address and other information which may be used to extract packets to the datapath of the primary over the encrypted link. In at least some embodiments, a group (e.g., pair) of routers may be identified as protecting a particular service instance (e.g., a VRRP/VPRN instance) and may share the policy configuration state and the session state for that service instance without affecting other service instances or sessions supported by any of the routers. In at least some embodiments, a router may be configured to provide high availability and multipath routing individually for single service instances (e.g., VRRP, VPRN, VPLS, or the like) with one peer or more than one peer. In at least some embodiments, a router may be configured to provide high availability and multipath routing individually for different service instances (e.g., VPRN1 and VPRN2, VRRP1 and VRRP2, or the like) with a different peer or collection of peers for each service instance. In at least some embodiments, a router may be configured to partition service instances into those for which high availability and multipath routing are supported and those for which high availability and multipath routing are not protected. In at least some embodiments, a router may be configured to operate as (1) a primary for some service instances upon which session establishment takes place and from which policy for those service instances is distributed and (2) a secondary for one or more other service instances, receiving service instance policy and new sessions from the associated primary for those other service instances. It is noted that routers that are peered for providing high availability and multipath routing may share session information directly at the datapath layer to achieve low latency in session handling. It is noted that at least some such embodiments may allow multiple routers and appliances to be replaced by a smaller number of routers and appliances while unifying the management of high availability protected service instances (e.g., VPPR instances, VPRN instances, VPLS instances, or the like) with the firewall policy that protects those service instances.

It will be appreciated that various embodiments of the reliable firewall presented herein may be configured to support various virtual service support scenarios for various types of virtual services (e.g., VRRPs, VPRNs, VPLSs, or the like, as well as various combinations thereof) based on various policy synchronization capabilities. In at least some embodiments, the primary may keep the policy on the secondary in very close synchronization by sending draft policy updates from the primary to the secondary as they are received by or generated by the primary. In at least some embodiments, the draft-to-active switchover may be synchronized, thereby reducing or minimizing the interval where new session establishment is delayed by policy mismatch. In at least some embodiments, this type of close synchronization of policy between primary and secondary may be supported by close primary to secondary coordination. In at least some embodiments, this type of close synchronization of policy between primary and secondary may provide redundancy without the requirement for the peers to be identical in configuration or capacity. In at least some embodiments, this type of close synchronization of policy between primary and secondary may accommodates multiple firewall instances with each being dedicated to a particular redundant service instance (e.g., a particular router can host separate redundant firewalls for each of two different VRRP instances, such as one involving router A and router B and another involving router B and router C and, further, a third firewall instance on the same router may support MLAG with a fourth router). It is noted that support for multiple redundant service instances in which manner may be supported by the ability to join different models and configurations of routers into a redundant pair and the ability to support multiple redundant services involving different peer routers on a single router instance. It will be appreciated that various other policy synchronization capabilities may be used to support various virtual service support scenarios for various types of virtual services.

It will be appreciated that various embodiments of the reliable firewall presented herein may be configured to support various virtual service support scenarios for various types of virtual services (e.g., VRRPs, VPRNs, VPLSs, or the like, as well as various combinations thereof) based on various session state synchronization capabilities. In at least some embodiments, session establishment latency may be reduced or minimized by having the data paths of the peered routers directly communicate. In at least some embodiments, distribution of session state may be performed directly between the datapaths of among a network of heterogeneous peered routers (e.g., different models, capacities, or the like) supporting multiple service instances of multiple services. In at least some embodiments, by incorporating the service identifier (e.g., VRRP ID, VRPN ID, VPLS ID, or the like) into the firewall match tuple, the solution may be selective on which services are protected. For example, VRRP may be supported on a VPRN or VPLS service instance and one VRRP/VPRN instance may be protected with one peer while a different VRRP/VPRN instance may be protected with a different peer with no conflict or complex configuration. In at least some embodiments, distribution of session state may be performed in a manner enabling the routers to be service aware (e.g., by enabling the firewall to be aware of the virtual endpoints of the services (e.g., service access points, service distribution points, service distribution point bindings or the like), thereby enabling certain services to be protected (while also identifying the peer(s) that provide the protection). It will be appreciated that various other session state synchronization capabilities may be used to support various virtual service support scenarios for various types of virtual services.

It is noted that use of various embodiments of the reliable firewall presented herein in order to support various virtual service support scenarios for various types of virtual services (e.g., VRRPs, VPRNs, VPLSs, or the like) may be further understood by way of reference to FIGS. 8 and 9 which are discussed further below.

Figure 8:
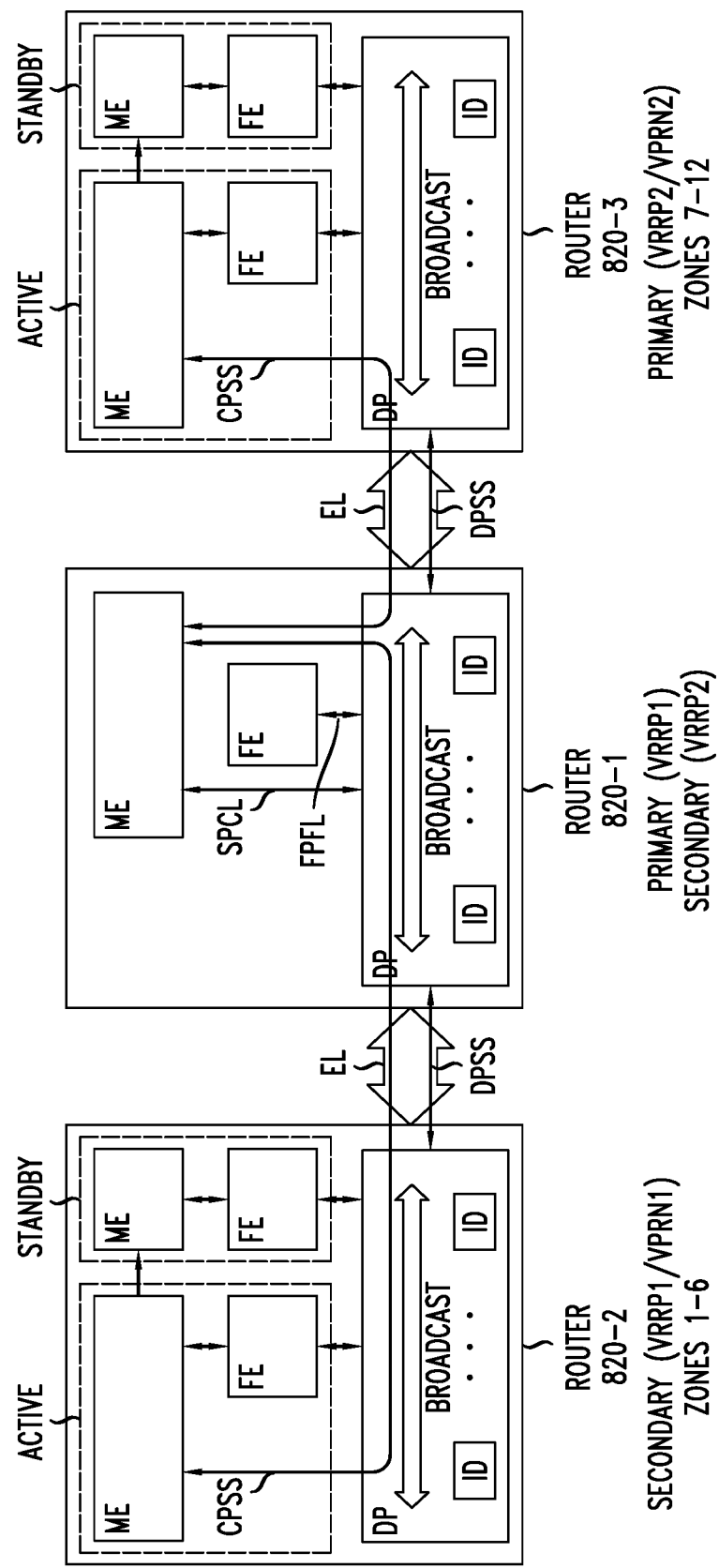
FIG. 8 depicts an example embodiment of a reliable firewall configured to support multiple high availability relationships.

FIG. 8 depicts an example embodiment of a reliable firewall configured to support multiple high availability relationships. In general, the configuration of FIG. 8 supports active-active disjoint service instances (e.g., primarily presented within the context of supporting VRRPs). In FIG. 8, three routers 820 (illustratively, routers 820-1, 820-2, and 820-3) are used to support reliable firewalls for multiple services. The routers 820 each may be configured as presented with respect to routers 120 of FIG. 1 (e.g., each router 820 includes a datapath having interface devices, at least one firewall engine, and at least one management engine). In FIG. 8, the router 820-1 is the primary for VRRP1 and the secondary for VRRP2. In FIG. 8, the router 820-2 is the secondary for VRRP1/VPRN1 and supports zones 1-6. In FIG. 8, the router 820-3 is the primary for VRRP2/VPRN2 and supports zones 7-12. In the configuration of FIG. 8, multiple VRRPs may be supported where each may be configured through separate zones. In the configuration of FIG. 8, single services may be protected with selective duplication of session information. In the configuration of FIG. 8, all routers may establish sessions with one router being designated as the primary for each service so that LAGs may be supported. In the configuration of FIG. 8, to support an active-active, arrangement, the session pool may be partitioned to reserve session objects/capacity for each VRRP. In the configuration of FIG. 8, session ID offset may be configured on each peer router so that session numbers received from a peer may be efficiently mapped to the local session ID. In the configuration of FIG. 8, for each secondary router, the primary router may maintain a list of the zones whose policies are to be replicated on the indicated secondary (e.g., using a 254-bit bitmap or other suitable bitmap or data structure). In the configuration of FIG. 8, each secondary router may be preconfigured with protected zones, and interfaces may be assigned or removed from the protected zones at any time. In the configuration of FIG. 8, the administrator may assure that the zones are created in the appropriate service instances (e.g., VRRP, VPRN, or the like) on the protection pair. In the configuration of FIG. 8, protected zones may be marked in the management engine and the datapath with primary/secondary status and packets received for zones that are marked as secondary that are to be handled by the firewall are sent to the datapath of the primary for extraction/copy to the management engine of the primary. In the configuration of FIG. 8, for each secondary router, the primary router may synchronize the security profiles and NAT profiles used by the protected zones. In the configuration of FIG. 8, security log profiles are expected to be already present through prior configuration. In the configuration of FIG. 8, protected zones in the secondary routers may be marked to indicate which primary owns them. In the configuration of FIG. 8, sessions associated with non-protected zones and zones for which the local router is the primary may be handled by the local router while other sessions may be handled by the remote primary.

Figure 9:
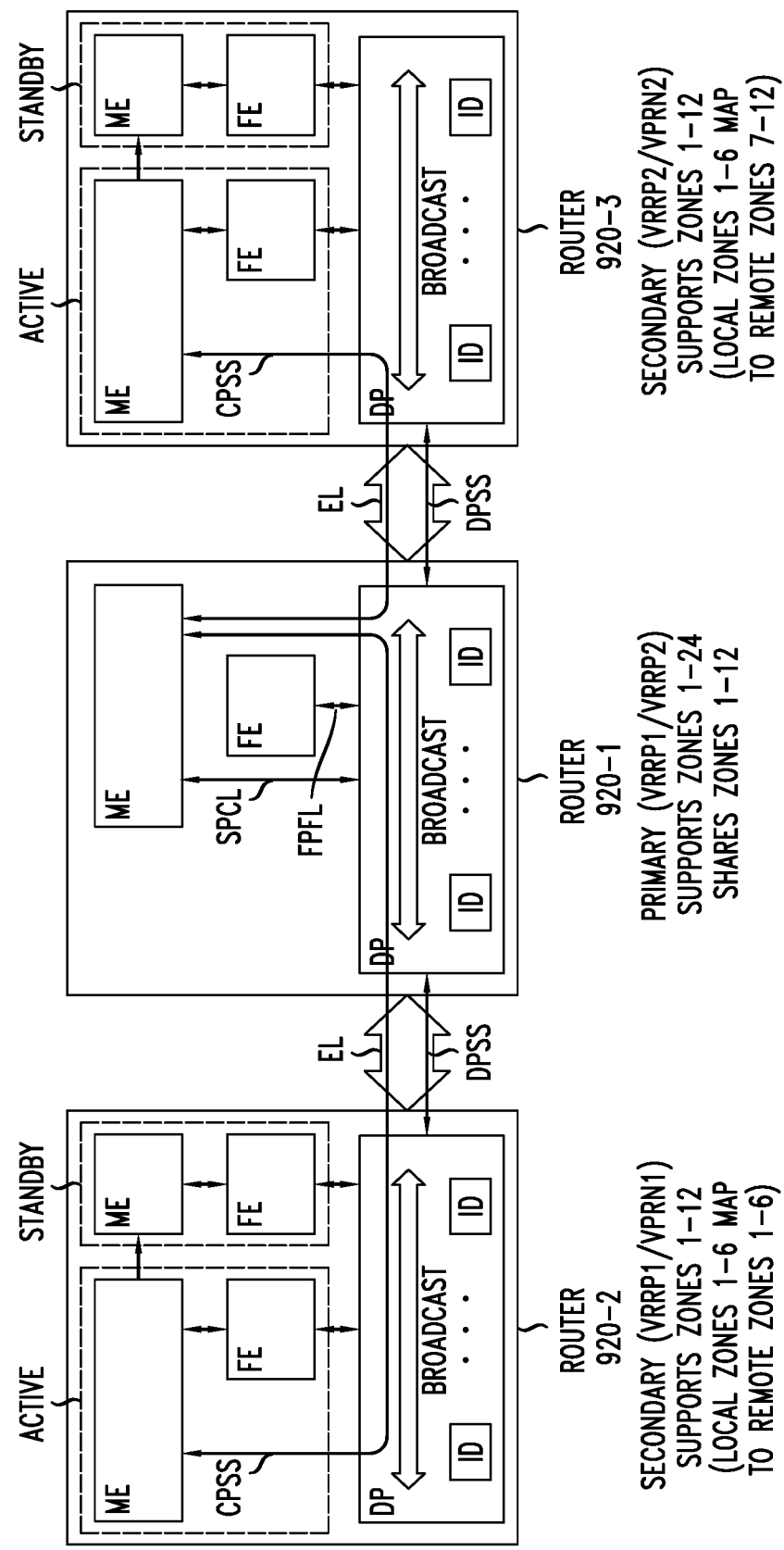
FIG. 9 depicts an example embodiment of a reliable firewall configured to support protected high availability zones and non-protected zones.

FIG. 9 depicts an example embodiment of a reliable firewall configured to support protected high availability zones and non-protected zones. In general, the configuration of FIG. 9 supports symmetrical redundancy for service instances (e.g., primarily presented within the context of supporting VRRPs). In FIG. 9, three routers 920 (illustratively, routers 920-1, 920-2, and 920-3) are used to support reliable firewalls for multiple services. The routers 920 each may be configured as presented with respect to routers 120 of FIG. 1 (e.g., each router 920 includes a datapath having interface devices, at least one firewall engine, and at least one management engine). In FIG. 9, the router 920-1 is the primary for VRRP1 and VRRP2, supports zones 1-24, and shares zones 1-12. In FIG. 9, the router 920-2 is the secondary for VRRP1/VPRN1 and supports zones 1-12 where local zones 1-6 map to remote zones 1-6. In FIG. 9, the router 920-3 is the secondary for VRRP2/VPRN2 and supports zones 1-12 where local zones 1-6 map to remote zones 7-12. In the configuration of FIG. 9, the zones on each router may be reserved for sharing and redundancy (e.g., VRRP1). In the configuration of FIG. 9, a zone ID mapping may be configured for each router pair. In the configuration of FIG. 9, one of the two router pairs may be designated as the primary for the shared zones. In the configuration of FIG. 9, for convenience, zone ranges might be allocated. In the configuration of FIG. 9, the firewall sessions may be local and not redundant or shared and redundant. In the configuration of FIG. 9, the session pool may be partitioned to reserve session objects/capacity for each VRRP. In the configuration of FIG. 9, for convenience, session ID ranges might be allocated. In the configuration of FIG. 9, the session ID mapping may be configured on each peer router in such a way that session numbers received from a peer may be efficiently mapped to the local session ID. The configuration of FIG. 9 may enable a customer to select those service instances for which high availability is used while allowing any remaining service instance to be supported by the firewall but without being protected for high availability. The configuration of FIG. 9 also may enable support for multipath routing (e.g., for services, such as VRRP, which may require multipath routing or for services which may benefit from or employ multipath routing) when multiple different routers share a common router for high availability protection.

Figure 10:
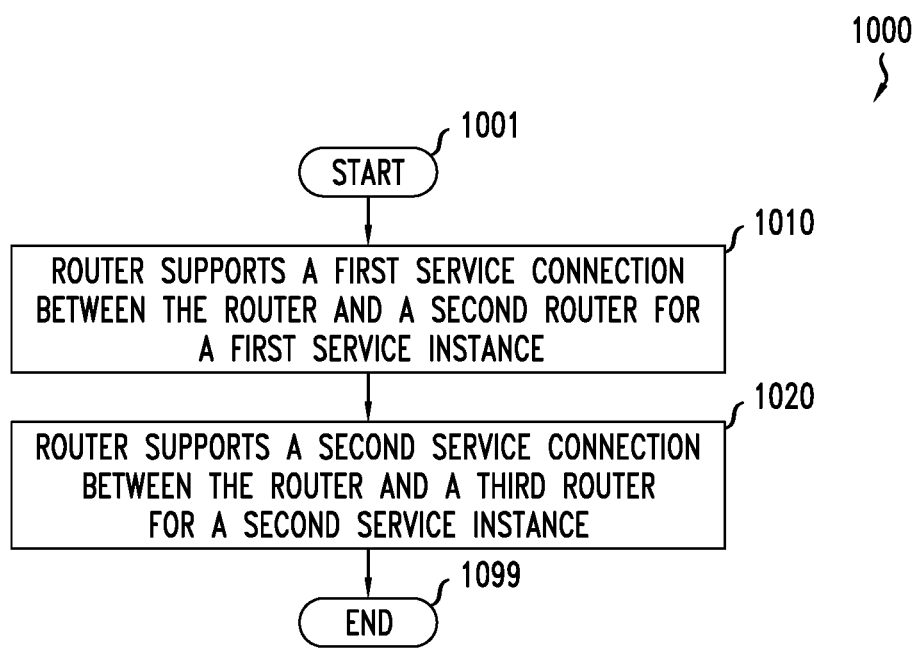
FIG. 10 depicts an example embodiment of a method for use by a router to support multiple service instances with high availability.

FIG. 10 depicts an example embodiment of a method for use by a router to support multiple service instances with high availability. At block 1001, method 1000 begins. At block 1010, the router supports a first service connection between the router and a second router for a first service instance. At block 1020, the router supports a second service connection between the router and a third router for a second service instance. The router may be configured as a primary router for the first service instance and a secondary router for the second service instance, the second router may be configured as a secondary router for the first service instance, and the third router is configured as a secondary router for the second service instance. The router may be configured as a primary router for the first service instance and a primary router for the second service instance, the second router may be configured as a secondary router for the first service instance, and the third router is configured as a secondary router for the second service instance. The first service instance may include a virtual service instance (e.g., at least one of a VRRP instance (e.g., VRRP/VPRN, VRRP/IES, or the like), a VPRN instance, or a VPLS instance) and, similarly, the second service instance may include a virtual service instance (e.g., at least one of a VRRP instance (e.g., VRRP/VPRN, VRRP/IES, or the like), a VPRN instance, or a VPLS instance). At block 1099, method 1000 ends.

Various example embodiments for supporting a reliable firewall for protecting high-availability network services may provide various advantages or potential advantages. For example, various example embodiments for supporting a reliable firewall may be configured to provide a stateful firewall supporting multipath communications (e.g., VRRP (in which opposite directions of the same session may traverse different VRRP routers), LAG, or the like) that can recover rapidly under a variety of failure scenarios without loss of established sessions. For example, various example embodiments for supporting a reliable firewall may be configured to prevent or to tend to prevent race conditions which may result when messages used for session establishment may traverse different router-hosted firewall instances (e.g., in TCP, where the SYN and SYN-ACK packets traverse different router-hosted firewall instances and firewall session state information has not been distributed and installed into the data path responsive to the SYN packet before the SYN-ACK packet is received). Various example embodiments for supporting a reliable firewall for protecting high-availability network services may provide various other advantages or potential advantages.

Figure 11:
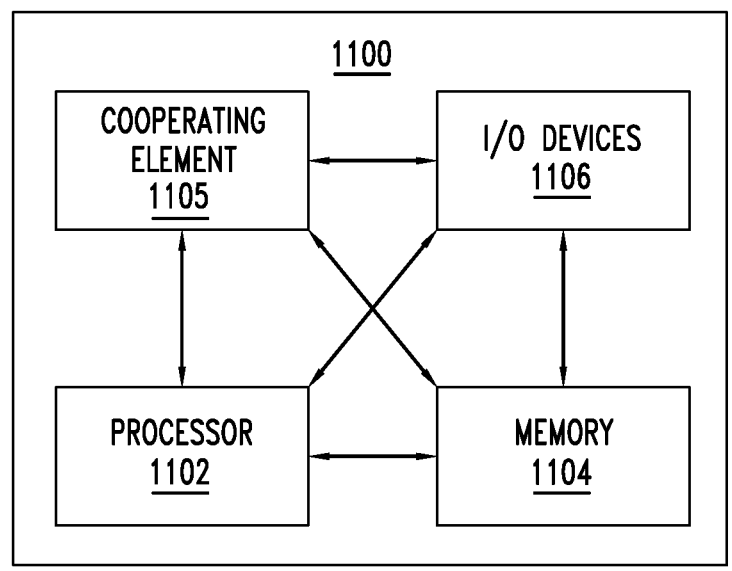
FIG. 11 depicts a high-level block diagram of a computer suitable for use in performing various functions presented herein.

FIG. 11 depicts a high-level block diagram of a computer suitable for use in performing various functions described herein.

The computer 1100 includes a processor 1102 (e.g., a central processing unit (CPU), a processor having a set of processor cores, a processor core of a processor, or the like) and a memory 1104 (e.g., a random access memory (RAM), a read only memory (ROM), or the like). The processor 1102 and the memory 1104 may be communicatively connected.

The computer 1100 also may include a cooperating element 1105. The cooperating element 1105 may be a hardware device. The cooperating element 1105 may be a process that can be loaded into the memory 1104 and executed by the processor 1102 to implement functions as discussed herein (in which case, for example, the cooperating element 1105 (including associated data structures) can be stored on a non-transitory computer-readable storage medium, such as a storage device or other storage element (e.g., a magnetic drive, an optical drive, or the like)).

The computer 1100 also may include one or more input/output devices 1106. The input/output devices 1106 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 1100 of FIG. 11 may represent a general architecture and functionality suitable for implementing functional elements described herein, portions of functional elements described herein, or the like, as well as various combinations thereof. For example, computer 1100 may provide a general architecture and functionality that is suitable for implementing one or more elements presented herein, such as MS 110 or a portion thereof, a router 120 or a portion thereof, or any other elements presented herein.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits (ASIC), and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
at least one processor; and
at least one memory including computer program code;
wherein the at least one memory and the computer program code are configured to, with the at least one processor, cause the apparatus to at least:
support communication of firewall session state information of a firewall from a first firewall instance of the firewall on a primary router to a second firewall instance of the firewall on a secondary router via a datapath secure session between a datapath of the primary router and a datapath of the secondary router.

2. The apparatus of claim 1, wherein the firewall session state information of the firewall includes at least one of existing session state information or new session state information.

3. The apparatus of claim 1, wherein, to support communication of the firewall session state information of the firewall via the datapath secure session, the at least one memory and the computer program code are configured to, with the at least one processor, cause the apparatus to at least:
provide the firewall session state information from the first firewall instance of the firewall on the primary router to the datapath of the primary router via a fast-path firewall link.

4. The apparatus of claim 1, wherein, to support communication of the firewall session state information of the firewall via the datapath secure session, the at least one memory and the computer program code are configured to, with the at least one processor, cause the apparatus to at least:
receive the firewall session state information of the firewall at the datapath of the primary router from the first firewall instance of the firewall on the primary router via a fast-path firewall link; and
send the firewall session state information of the firewall from the datapath of the primary router toward the datapath of the secondary router via the datapath secure session.

5. The apparatus of claim 1, wherein, to support communication of the firewall session state information of the firewall via the datapath secure session, the at least one memory and the computer program code are configured to, with the at least one processor, cause the apparatus to at least:
receive the firewall session state information of the firewall at the datapath of the secondary router from the datapath of the primary router via the datapath secure session; and
send the firewall session state information of the firewall from the datapath of the secondary router to the second firewall instance of the firewall on the secondary router via a fast-path firewall link.

6. The apparatus of claim 1, wherein, to support communication of the firewall session state information of the firewall via the datapath secure session, the at least one memory and the computer program code are configured to, with the at least one processor, cause the apparatus to at least:
receive the firewall session state information of the firewall at the second firewall instance of the firewall on the secondary router from the datapath of the secondary router via a fast-path firewall link; and
distribute the firewall session state information of the firewall from the second firewall instance of the firewall on the secondary router to a set of interface devices of the secondary router.

7. The apparatus of claim 1, wherein the at least one memory and the computer program code are configured to, with the at least one processor, cause the apparatus to at least:
support communication of the firewall session state information of the firewall from the first firewall instance of the firewall on the primary router to the second firewall instance of the firewall on the secondary router via a control plane secure session between a management instance of the primary router and a management instance of the secondary router.

8. The apparatus of claim 7, wherein, to support communication of the firewall session state information of the firewall via the control plane secure session, the at least one memory and the computer program code are configured to, with the at least one processor, cause the apparatus to at least:
receive the firewall session state information of the firewall at the management instance of the primary router from the first firewall instance of the firewall on the primary router; and
send the firewall session state information of the firewall from the management instance of the primary router toward the management instance of the secondary router via the control plane secure session.

9. The apparatus of claim 7, wherein, to support communication of the firewall session state information of the firewall via the control plane secure session, the at least one memory and the computer program code are configured to, with the at least one processor, cause the apparatus to at least:
receive the firewall session state information of the firewall at the management instance of the secondary router from the management instance of the primary router via the control plane secure session; and
provide the firewall session state information of the firewall from the management instance of the secondary router to the second firewall instance of the firewall on the secondary router.

10. The apparatus of claim 7, wherein, to support communication of the firewall session state information of the firewall via the control plane secure session, the at least one memory and the computer program code are configured to, with the at least one processor, cause the apparatus to at least:

receive the firewall session state information of the firewall at the second firewall instance of the firewall on the secondary router from the management instance of the secondary router; and distribute the firewall session state information of the firewall from the second firewall instance of the firewall on the secondary router to a set of interface devices of the secondary router.

11. The apparatus of claim 1, wherein the at least one memory and the computer program code are configured to, with the at least one processor, cause the apparatus to at least:

receive, at an interface device of the primary router, a packet;

determine, by the interface device of the primary router based on the packet, context information associated with the packet;

send, by the interface device of the primary router toward the first firewall instance of the firewall on the primary router via a fast-path firewall link, the context information associated with the packet; and receive, by the interface device of the primary router, the firewall session state information of the firewall.

12. The apparatus of claim 1, wherein the at least one memory and the computer program code are configured to, with the at least one processor, cause the apparatus to at least:

receive, at an interface device of the secondary router, a packet;

determine, by the interface device of the secondary router based on the packet, context information associated with the packet;

send, by the interface device of the secondary router toward the datapath of the secondary router, the context information associated with the packet; and receive, by the interface device of the secondary router, the firewall session state information of the firewall.

13. The apparatus of claim 1, wherein the at least one memory and the computer program code are configured to, with the at least one processor, cause the apparatus to at least:

receive, at the datapath of the secondary router from an interface device of the secondary router, context information associated with a packet received at the interface device of the secondary router; and send, by the datapath of the secondary router toward the datapath of the primary router via the datapath secure session, the context information.

14. The apparatus of claim 1, wherein the at least one memory and the computer program code are configured to, with the at least one processor, cause the apparatus to at least:

receive, at the datapath of the primary router from the datapath of the secondary router via the datapath secure session, context information associated with a packet received at an interface device of the secondary router; and send, by the datapath of the primary router toward the first firewall instance of the firewall on the primary router via a fast-path firewall link, the context information.

15. The apparatus of claim 1, wherein, to support communication of the firewall session state information of the firewall via the datapath secure session, the at least one memory and the computer program code are configured to, with the at least one processor, cause the apparatus to at least:

receive the firewall session state information of the firewall at the datapath of the primary router from the first firewall instance of the firewall on the primary router via a fast-path firewall link; and broadcast, by the datapath of the primary router, the firewall session state information of the firewall toward a set of interface devices of the primary router and toward the datapath of the secondary router via the datapath secure session.

16. The apparatus of claim 1, wherein, to support communication of the firewall session state information of the firewall via the datapath secure session, the at least one memory and the computer program code are configured to, with the at least one processor, cause the apparatus to at least:

receive the firewall session state information of the firewall at the datapath of the secondary router from the datapath of the primary router via the datapath secure session; and broadcast, by the datapath of the secondary router, the firewall session state information of the firewall toward a set of interface devices of the secondary router.

17. The apparatus of claim 1, wherein the apparatus is the primary router or the secondary router.

18. An apparatus, comprising:
at least one processor; and
at least one memory including computer program code;
wherein the at least one memory and the computer program code are configured to, with the at least one processor, cause the apparatus to at least:
determine, by a primary router supporting a firewall policy of a firewall and based on firewall policy information, a change to the firewall policy of the firewall at the primary router;
send, by the primary router toward a secondary router supporting the firewall policy of the firewall, the firewall policy information;
apply, by the primary router, the change to the firewall policy of the firewall at the primary router; and
send, by the primary router toward the secondary router, an indication of application of the change to the firewall policy of the firewall at the primary router.

19. An apparatus, comprising:
at least one processor; and
at least one memory including computer program code;
wherein the at least one memory and the computer program code are configured to, with the at least one processor, cause the apparatus to at least:
receive, by a secondary router supporting a firewall policy of a firewall from a primary router supporting the firewall policy of the firewall, firewall policy information associated with the firewall policy of the firewall;
determine, by the secondary router based on the firewall policy information, a change to the firewall policy of the firewall;
receive, by the secondary router from the primary router, an indication of application of the change to the firewall policy of the firewall at the primary router; and
apply, by the secondary router based on the indication of application of the change to the firewall policy of the firewall at the primary router, the change to the firewall policy of the firewall at the secondary router.

* * * * *